United States Patent
Kyouno

(10) Patent No.: US 9,742,553 B2
(45) Date of Patent: Aug. 22, 2017

(54) TRANSMISSION APPARATUS AND PLUG-IN UNIT

(71) Applicant: FUJITSU LIMITED, Kawasaki-shi, Kanagawa (JP)

(72) Inventor: Toshihisa Kyouno, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/356,959

(22) Filed: Nov. 21, 2016

(65) Prior Publication Data
US 2017/0155501 A1 Jun. 1, 2017

(30) Foreign Application Priority Data
Dec. 1, 2015 (JP) ................... 2015-235123

(51) Int. Cl.
 *H04L 7/04* (2006.01)
 *H04L 7/00* (2006.01)
 *H04B 1/40* (2015.01)
(52) U.S. Cl.
 CPC ........... *H04L 7/04* (2013.01); *H04B 1/40* (2013.01); *H04L 7/0079* (2013.01); *H04L 7/0091* (2013.01)
(58) Field of Classification Search
 CPC ....... H04L 7/04; H04L 7/0079; H04L 7/0091; H04B 1/40
 See application file for complete search history.

(56) References Cited

U.S. PATENT DOCUMENTS 6,118,317 A 9/2000 Ejiri

FOREIGN PATENT DOCUMENTS

| JP | 10-200515 | 7/1998 |
| JP | 10-257038 | 9/1998 |
| JP | 2008-252824 | 10/2008 |

*Primary Examiner* — Janice Tieu
(74) *Attorney, Agent, or Firm* — Staas & Halsey LLP

(57) ABSTRACT

A transmission apparatus includes: a first plug-in unit including: a clock generator to generate a first clock, a first frame-pulse generator to generate a first frame-pulse-signal based on the first clock; a detector to detect a phase-difference between a first phase of the first frame-pulse-signal and a second phase of a second frame-pulse-signal transmitted from other plug-in unit, and generate phase-difference information based on the phase-difference, and a first transmitter to transmit a control-signal including the phase-difference information to the other plug-in unit; and a second plug-in unit being the other plug-in unit, including: a receiver to receive the control-signal, a controller to control a phase of a second clock of the second plug-in unit, based on the phase-difference information, a second frame-pulse generator to generate the second frame-pulse-signal based on the second clock, and a second transmitter to transmit the second frame-pulse-signal to the first plug-in unit.

19 Claims, 18 Drawing Sheets

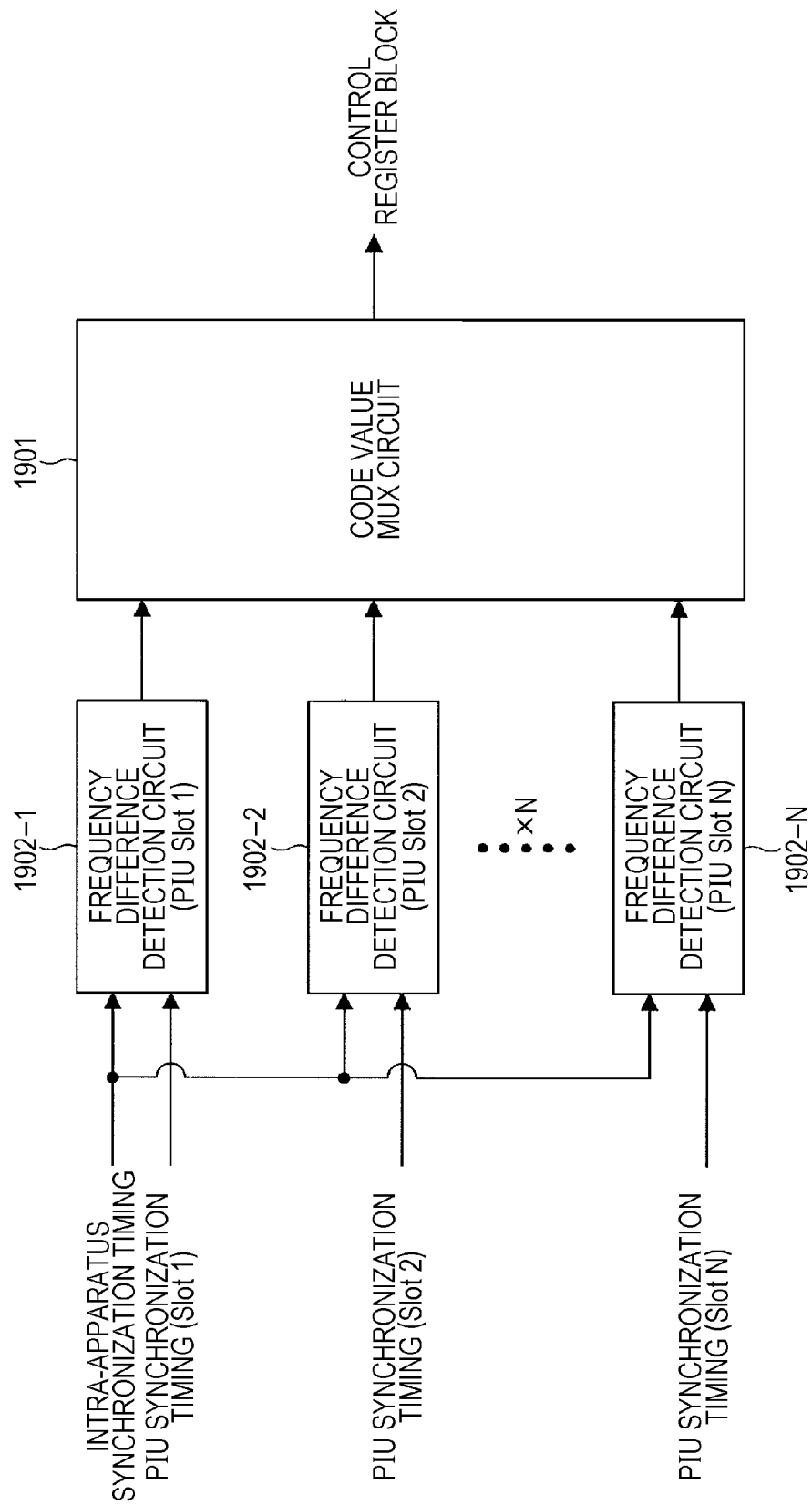

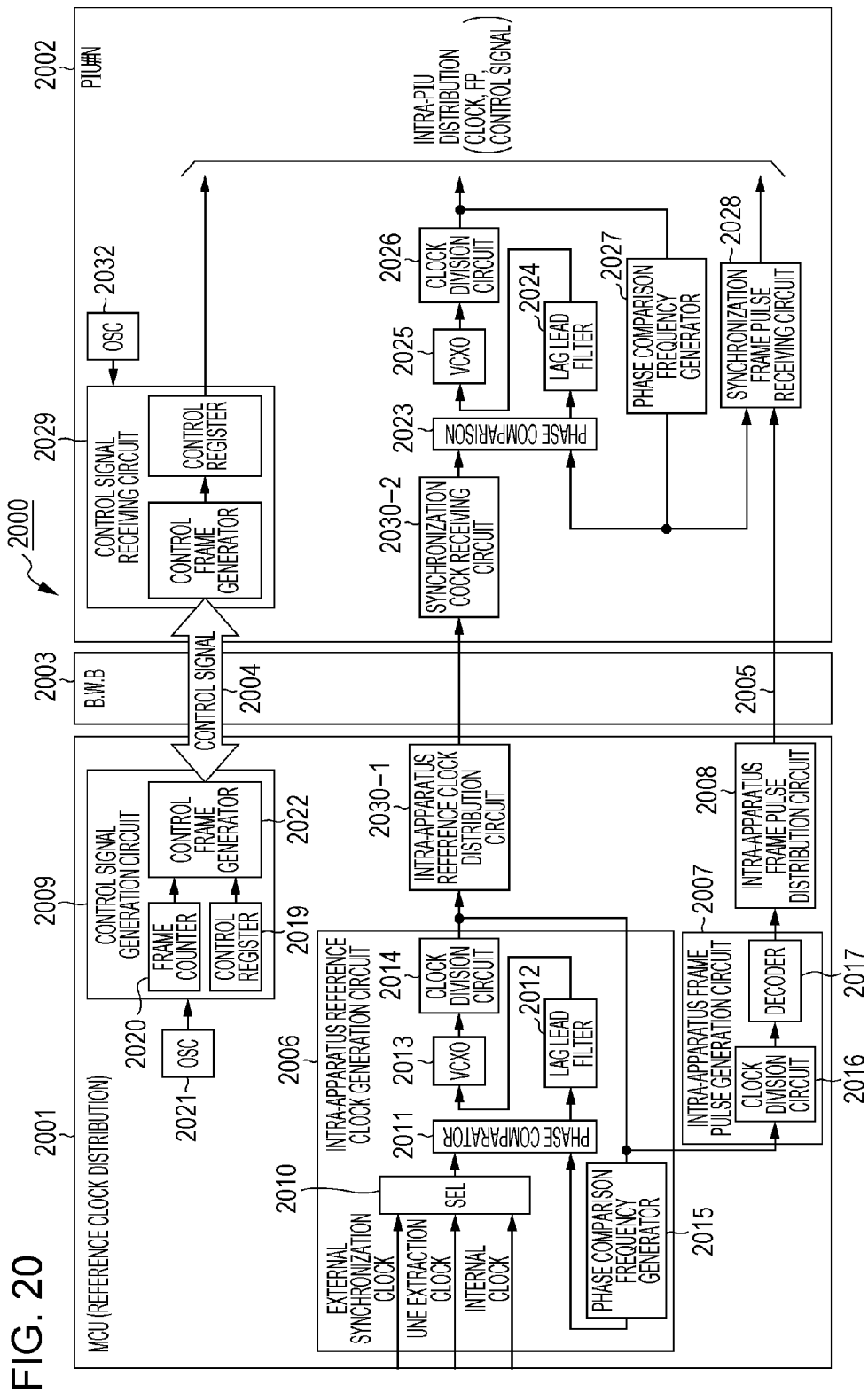

TRANSMISSION APPARATUS AND PLUG-IN UNIT

CROSS-REFERENCE TO RELATED APPLICATION

This application is based upon and claims the benefit of priority of the prior Japanese Patent Application No. 2015-235123, filed on Dec. 1, 2015, the entire contents of which are incorporated herein by reference.

FIELD

The embodiment discussed herein is related to a transmission apparatus and a plurality of plug-in units each executes a part of functions of the transmission apparatus.

BACKGROUND

A transmission apparatus includes a plurality of plug-in units. In order to transmit and receive signals among these plurality of plug-in units without signals being lost, electrical components, optical components, and the like are mounted on the respective plug-in units, and synchronization of clock signals and frame pulse signals used in the respective plug-in units is established.

As a method of establishing synchronization of clock signals among the plurality of plug-in units, the following method is known. For example, a reference clock signal as a reference of synchronization between plug-in units is sent from a first plug-in unit among the plurality of plug-in units to a second plug-in unit that is different from the first plug-in unit, and a clock signal generated by the second plug-in unit is returned to the first plug-in unit. The first plug-in unit compares a phase of the returned clock signal with that of the reference clock signal, and feedbacks a result of the comparison to the second plug-in unit. The second plug-in unit corrects the phase of the clock signal based on the fed back result of the comparison.

In addition, a method of using an operation circuit for phase comparison in relation to synchronization of clocks to control a variation amount of the clocks is also known.

Examples of related art documents include Japanese Laid-open Patent Publication Nos. 2008-252824, 10-200515, and 10-257038.

SUMMARY

According to an aspect of the invention, a transmission apparatus including a plurality of plug-in units each executing a part of functions of the transmission apparatus, the transmission apparatus includes: a first plug-in unit of the plurality of plug-in units configured to include: a clock generator configured to generate a first clock signal, a first frame pulse generator configured to generate a first frame pulse signal based on the first clock signal; a detector configured to compare a first phase of the first frame pulse signal with a second phase of a second frame pulse signal transmitted from other plug-in unit of the plurality of plug-in units, detect a phase difference between the first phase and the second phase, and generate phase difference information based on the phase difference detected, and a first transmitter configured to transmit a control signal including the phase difference information to the other plug-in unit; and a second plug-in unit of the plurality of plug-in units, being the other plug-in unit, configured to include: a receiver configured to receive the control signal transmitted from the first plug-in unit, a controller configured to control a phase of a second clock signal generated by the second plug-in unit, based on the phase difference information included in the control signal, a second frame pulse generator configured to generate the second frame pulse signal having the second phase based on the second clock signal, and a second transmitter configured to transmit the second frame pulse signal to the first plug-in unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 19 is a diagram illustrating an example of a configuration of the frequency difference detection circuit provided in the first plug-in unit of the transmission apparatus according to the embodiment; and FIG. 20 is a functional block diagram of a transmission apparatus according to a comparative example.

DESCRIPTION OF EMBODIMENT

In recent years, an increase in capacity of transmission apparatuses has been advanced, and the number of plug-in units accommodated in each transmission apparatus has increased. Therefore, the number of signal lines connected to the plug-in units has increased.

According to the aforementioned method, at least two signal lines are provided for one clock signal. This is because at least one signal line is used for sending a reference clock signal from a first plug-in unit to a second plug-in unit, and at least one signal line is used for replying a clock signal from the second plug-in unit to the first plug-in unit.

In order to perform synchronization between frame pulses of the first plug-in unit and the second plug-in unit in addition to synchronization of the clock signals, at least two more signal lines are used.

Therefore, the number of signal lines connected to the plug-in units increases as an increase in the number of plug-in units.

Hereinafter, description will be given of an embodiment of a technology capable of reducing the number of signal lines connected to plug-in units with reference to drawings.

Figure 1:
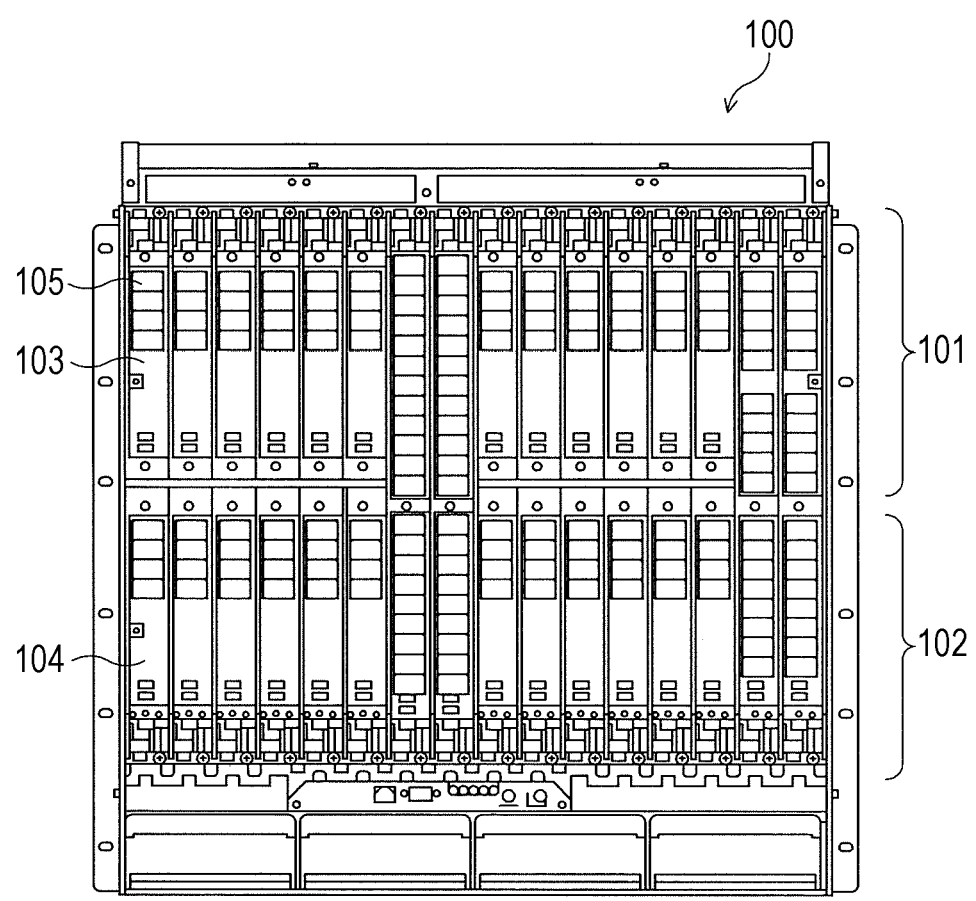
FIG. 1 is a front view of a main body (case body) of a transmission apparatus according to an embodiment.

FIG. 1 is a front view of a main body (case body 100) of a transmission apparatus according to an embodiment. The case body 100 includes an upper stage 101 located on the upper side and a lower stage 102 located on the lower side in FIG. 1, and a plurality of plug-in units can be attached to a plurality of slots 103, . . . , 104, . . . in each stage. A plurality of connectors 105 are arranged in each slot. In addition, a plug-in unit on which electronic components, optical components, and the like are mounted is attached to each slot so as to be freely inserted and pulled out, and a connector of each plug-in unit and a connector of each slot are connected so as to face each other at the time of the attachment. This connection causes electrical connection between the slot and the connector pin of the plug-in unit and physical connection between the slot and the plug-in unit. Each plug-in unit is fixed to the case body 100 with a screw as appropriate. The case body 100 accommodates wiring for connecting each plug-in unit via the connector pin. The case body 100 has a function as a back wiring board (BWB).

In FIG. 1, the case body 100 includes slots with four connectors respectively arranged therein, slots with twelve connectors respectively arranged therein, and slots with ten connectors respectively arranged therein. Differences in the numbers of slots arranged can be set in accordance with types of plug-in units that can be attached to the slots. For example, a plug-in unit with a function of Optical Network Unit (ONU) for optical fiber communication can be attached to the slot with four connectors arranged therein. On the opposite side on which the plug-in unit with the ONU function is connected to the connector of the case body, a connector of an optical cable or the like is arranged. A plug-in unit with a switching function between another plug-in unit can be attached to the slot with twelve connectors arranged therein. A Management Control Unit (MCU) can be attached to the slot with ten connectors arranged therein. The transmission apparatus can be used not only for the optical fiber communication but also for other types of communication. For example, the transmission apparatus can also be used as an apparatus that forms a base station of mobile wireless communication.

The management control plug-in unit has a function of managing operation statuses of other plug-in units. That is, terminal devices for control and the like are connected to the management control plug-in unit, and the management control plug-in unit sets operation statuses of other plug-in units in response to commands input from the terminal devices and the like. For example, the management control plug-in units set network addresses and netmasks for other plug-in units. The management control plug-in unit monitors operating status of other plug-in units and displays the result thereon on the terminal devices and the like. For example, the management control plug-in unit inquires at other plug-in units about the number of packets processed by other plug-in units and obtains the number of the packets. The management control plug-in unit also monitors whether or not a failure has occurred in other plug-in units, and addresses the failure. In order to do so, the management control plug-in unit can perform data communication with other plug-in units and send and receive control signals.

The management control plug-in unit has a function of synchronizing frame pulses generated by other plug-in units attached to the case body 100 with a frame pulse generated by the management control plug-in unit. In order to do so, the frame pulses generated by other plug-in units are sent to the management control plug-in unit via the case body 100 as will be described below. The management control plug-in unit sends feedback information for synchronizing the frame pulses generated by other plug-in units with the frame pulse generated by the management control plug-in unit itself to other plug-in units. Here, the management control plug-in unit can include the feedback information in the control signal to be sent. In such a case, the management control plug-in unit can send encoded feedback information included in the control signal. "Send feedback information included in the control signal" means that the feedback information is sent along with other information. Examples of other information include network information such as network addresses set for other plug-in units and overhead information set for communication frames. It is possible to express the feedback information as digital information by encoding the feedback information as described above. In doing so, it is possible to send the feedback information along with other information as described above. The encoding enables reduction of the number of bits used.

The management control plug-in unit will be referred to as a "first plug-in unit" or an "MCU", other plug-in units will be referred to as a "second plug-in unit" or a "PIU" in the following description, and synchronization of frame pulses will be described. PIU is an abbreviation of a Plug In Unit.

Figure 2:
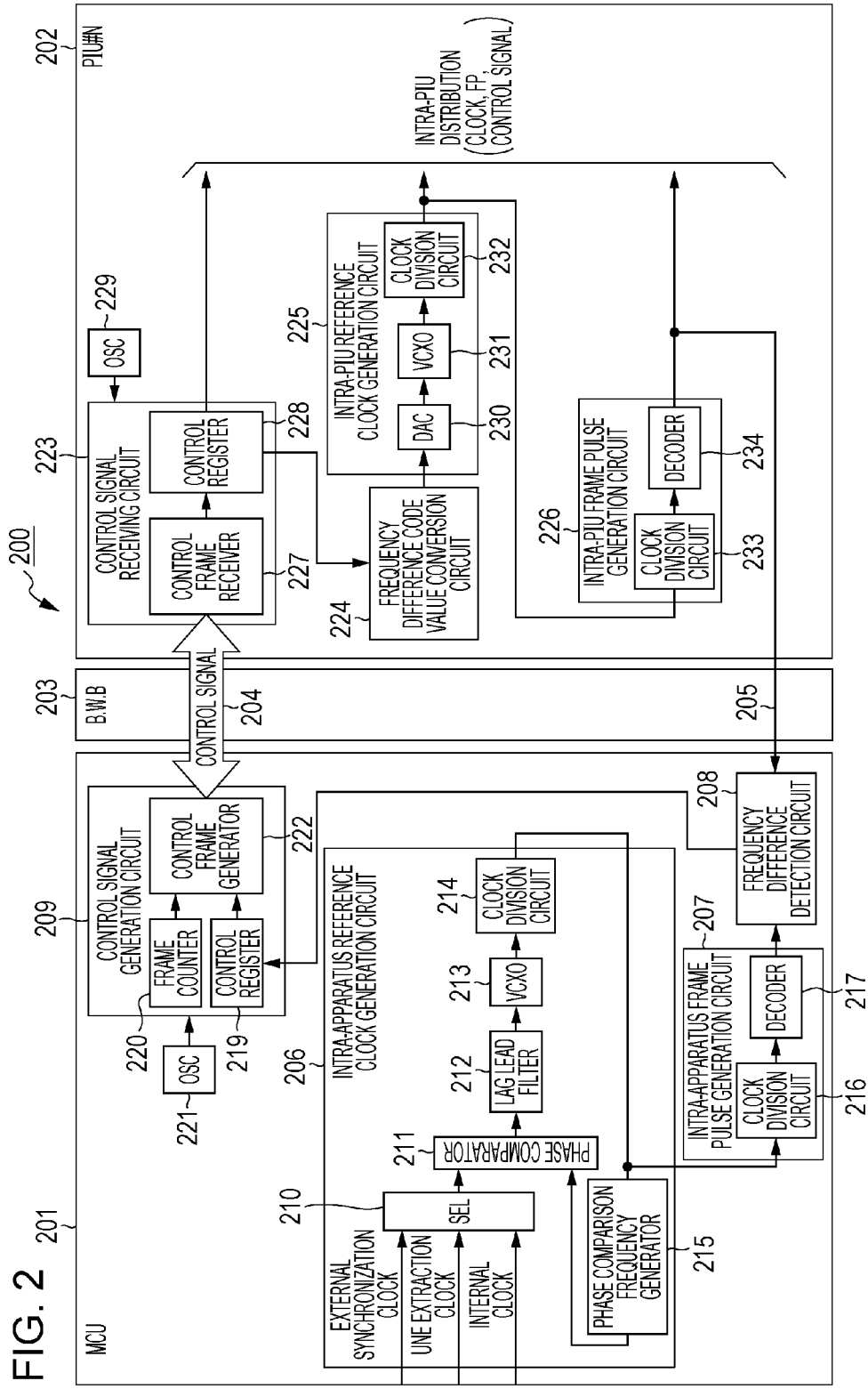
FIG. 2 is a functional block diagram of the transmission apparatus according to the embodiment.

FIG. 2 is a functional block diagram of a transmission apparatus according to an embodiment. A transmission apparatus 200 includes an MCU 201, a PIU 202, and a BWB 203. As described above, the MCU 201 and the PIU 202 are attached to slots of the case body 100 that provides a function of the BWB 203. The MCU 201 and the PIU 202 can send and receive signals via the BWB 203. The MCU 201 can receive a frame pulse signal 205 generated by the PIU 202 from the PIU 202 via the BWB 203. The frame pulse signal 205 will be referred to as a comparative frame pulse signal 205 and a second frame pulse signal 205 in some cases, and a pulse included in the frame pulse signal 205 will be referred to as a comparative frame pulse or a second frame pulse. Though not illustrated in FIG. 2, the BWB 203 may be able to supply power to the MCU 201 and the PIU 202.

Exemplary operations of the MCU 201 and the PIU 202 are as follows. In order that the MCU 201 and the PIU 202 respectively generate frame pulse signals in which pulses are synchronized (or synchronization of pulses is established between the MCU 201 and the PIU 202), the PIU 202 sends the generated comparative frame pulse signal 205 to the MCU 201. The MCU 201 detects a phase difference between the frame pulse signal generated by the MCU 201 itself and the comparative frame pulse signal, and sends and feeds back the detection result to the PIU 202 by including the result as encoded information in a control signal 204. The phase difference includes a difference between frequencies of the frame pulse signal generated by the MCU 201 and the frame pulse signal generated by the PIU 202. In addition, the phase difference includes whether or not synchronization has been established between a pulse included in the frame pulse signal generated by the MCU 201 and a pulse included in the frame pulse signal generated by the PIU 202. Information of the number of pulses used for establishing the synchronization can also be included in the phase difference.

The PIU 202 controls oscillation of a clock signal for generating the comparative frame pulse signal in accordance with information representing an encoded phase difference included in the control signal 204. If a frequency of the comparative frame pulse signal is lower than a frequency of the frame pulse signal (hereinafter, referred to as a reference frame pulse signal or the first frame pulse signal) generated by the MCU 201, an oscillation frequency of the clock signal is set to be high. If the frequency of the comparative frame pulse signal is higher than the frequency of the reference frame pulse signal, the oscillation frequency of the clock signal is set to be low. If the frequency of the comparative frame pulse signal is the same as the frequency of the reference frame pulse signal while the pulse of the comparative frame pulse signal is not synchronized with the pulse of the reference frame pulse signal, the clock signal is controlled so as to establish synchronization therebetween. In doing so, control is performed such that the comparative frame pulse signal is synchronized with the reference frame pulse signal. In addition, control is performed such that the clock signal generated in the PIU 202 is synchronized with the clock signal generated in the MCU 201. The pulse included in the reference frame pulse signal will be referred to as a reference frame pulse or a first frame pulse.

More specifically, the MCU 201 includes a Phase Locked Loop (PLL) circuit therein, generates a clock signal (hereinafter, also referred to as a "reference clock signal" in some cases) synchronized with a predetermined clock signal, and performs frequency division of the clock signal to generate a reference frame pulse signal. The PIU 202 includes an intra-PIU reference clock generator with a Voltage Controlled Xtal Oscillator (VCXO) 231, an application voltage to which is changed in accordance with an output value from a Digital to Analog Converter (DAC) 230, and performs frequency division of the clock signal generated by the intra-PIU reference clock generator to generate a comparative frame pulse signal. The generated comparative frame pulse signal is sent to the MCU 201. The MCU 201 detects a phase difference of the comparative frame pulse signal with respect to the reference frame pulse signal.

The PIU 202 outputs digital data, which is information representing an encoded phase difference included in the control signal 204 sent from the MCU 201, to the DAC 230. If the information representing the encoded phase difference included in the control signal 204 represents that the phase of the reference frame pulse signal is the same as that of the comparative frame pulse signal, the PIU 202 maintains a value to be input to the DAC 230. If a frequency of the comparative frame pulse signal is greater than that of the reference frame pulse signal, the value to be input to the DAC 230 is reduced. For example, a value obtained by subtracting a value represented by the encoded information from a current value is output to the DAC 230. If the frequency of the comparative frame pulse signal is lower than that of the reference frame pulse signal, the value to be input to the DAC 230 is increased. For example, a value obtained by adding the value represented by the encoded information to the current value is output to the DAC 230. Therefore, the encoded information can include a value that varies in accordance with a difference between the frequencies of the reference frame pulse signal and the comparative frame pulse signal. By including such information of the encoded value, it is possible to cause the frequency of the comparative frame pulse signal to greatly vary if the difference between the frequencies of the reference frame pulse signal and the comparative frame pulse signal is large. Therefore, it is possible to cause the phases of the reference frame pulse signal and the comparative frame pulse signal to become the same in a shorter period of time.

First, description will be given of the MCU 201. The MCU 201 includes an intra-apparatus reference clock generation circuit 206, an intra-apparatus frame pulse generation circuit 207, a frequency difference detection circuit 208, and a control signal generation circuit 209.

The intra-apparatus reference clock generation circuit 206 generates a reference clock signal as a reference used by the MCU 201 attached to the case body 100 to generate a reference frame pulse. The intra-apparatus reference clock generation circuit 206 will be simply referred to as a "first clock generator" in some cases. The intra-apparatus reference clock generation circuit 206 includes a selector (SEL) 210, a phase comparator 211, a lag lead filter 212, a VCXO 213, a frequency dividing circuit 214, and a phase comparison frequency generator 215.

The selector 210 selects a clock signal as a reference for the clock signal generated by the intra-apparatus reference clock generation circuit 206. In FIG. 2, the selector 210 can select a signal as a reference for the clock signal generated by the intra-apparatus reference clock generation circuit 206 from an external synchronization clock signal, a LINE extraction clock signal, and an internal clock signal. The external synchronization clock signal is a clock signal supplied from a clock signal generation device installed outside the transmission apparatus. The LINE extraction clock signal is a clock signal extracted from a communication signal received from another transmission apparatus. The internal clock signal is a clock signal generated by a clock generation device installed inside the case body 100 of the transmission apparatus.

In a case where the transmission apparatus 200 acts as a master station for another transmission apparatus, the selector 210 selects the internal clock signal. In a case where the transmission apparatus 200 acts as a subordinate station of another transmission apparatus, the selector 210 selects the external clock signal or the LINE extraction clock signal.

The clock signal selected by the selector 210 is output to the phase comparator 211.

The phase comparator 211 compares a phase of the clock signal output from the selector 210 with a phase of the clock signal output from the phase comparison frequency generator 215 and outputs the comparison result to the lag lead filter 212.

The lag lead filter 212 generates a voltage signal for correcting an oscillation frequency of the VCXO 213 in accordance with the phase comparison result output from the phase comparator 211 and outputs the voltage signal for correcting the oscillation frequency to the VCXO 213.

The VCXO 213 generates an oscillation signal at a frequency corrected by the voltage signal output from the lag lead filter 212 and outputs the oscillation signal to the frequency dividing circuit 214.

The frequency dividing circuit 214 divides the frequency of the oscillation signal generated by the VCXO 213 and generates a reference clock signal. The frequency dividing circuit 214 outputs the generated reference clock signal to the phase comparison frequency generator 215 and the intra-apparatus frame pulse generation circuit 207.

The phase comparison frequency generator 215 converts the reference clock signal output from the frequency dividing circuit 214 so as to be able to make a phase comparison with the clock signal selected by the selector 210. For example, the phase comparison frequency generator 215 multiplies the clock signal after being subjected to the frequency division by the frequency dividing circuit 214, generates a clock signal at a boosted frequency, and outputs the clock signal to the phase comparator 211.

Therefore, the phase comparator 211, the lag lead filter 212, the VCXO 213, the frequency dividing circuit 214, and the phase comparison frequency generator 215 form the PLL circuit. The PLL circuit generates a reference clock signal synchronized with the clock signal selected by the selector 210.

The intra-apparatus frame pulse generation circuit 207 generates a reference frame pulse as a reference for a frame pulse generated by another plug-in unit (PIU 202) in the apparatus based on the reference clock signal generated by the intra-apparatus reference clock generation circuit 206. The intra-apparatus frame pulse generation circuit 207 will also be referred to as a "first frame pulse generator" in some cases.

The intra-apparatus frame pulse generation circuit 207 includes a frequency dividing circuit 216 and a decoder 217.

The frequency dividing circuit 216 divides the frequency of the reference clock signal generated by the intra-apparatus reference clock generation circuit 206. For example, the frequency dividing circuit 216 performs the frequency division by using a counter. The frequency dividing circuit 216 outputs the reference clock signal after being subjected to the frequency division to the decoder 217. In a case where the frequency of the reference clock signal is 38.88 MHz, for example, the frequency division is performed by a 4860-bit counter, and the clock signal is divided into clock signals at 8 KHz and is then output to the decoder 217.

Figure 3:
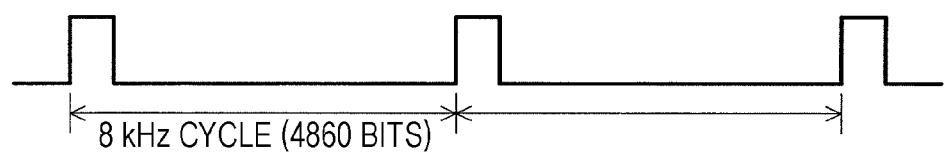
FIG. 3 is a diagram illustrating an example of a frame pulse generated by a first plug-in unit of a transmission apparatus according to the embodiment.

The decoder 217 converts the clock signal output from the frequency dividing circuit 216 into a reference frame pulse signal and outputs the reference frame pulse signal to the frequency difference detection circuit 208. In the case where the frequency dividing circuit 216 is the 4860-bit counter as described above, the decoder 217 outputs 1 (or H) when the output from the counter is 4859, and outputs 0 (or L) for other outputs. In doing so, the decoder 217 generates the reference frame pulse signal at 8 KHz as illustrated in FIG. 3 in the case where the frequency of the reference clock signal is 38.88 MHz.

The frequency difference detection circuit 208 detects a phase difference between the reference frame pulse signal output from the intra-apparatus frame pulse generation circuit 207 and the comparative frame pulse signal 205 sent from the PIU 202 via the BWB 203. For example, the frequency difference detection circuit 208 detects the phase difference by detecting a difference between the frequencies of the reference frame pulse signal and the comparative frame pulse signal. In addition, a replacement length from occurrence of the reference frame pulse to occurrence of the comparative frame pulse is measured, and the phase difference is detected.

The frequency difference detection circuit 208 outputs a signal representing the detected phase difference to the control signal generation circuit 209. Alternatively, the frequency difference detection circuit 208 outputs a signal representing information calculated from the obtained phase difference to the control signal generation circuit 209. The information representing the phase difference between the reference frame pulse signal and the comparative frame pulse signal or a value calculated from the phase difference will also be referred to as phase difference information in some cases. The frequency difference detection circuit 208 will also be referred to as a "detector".

Figure 4:
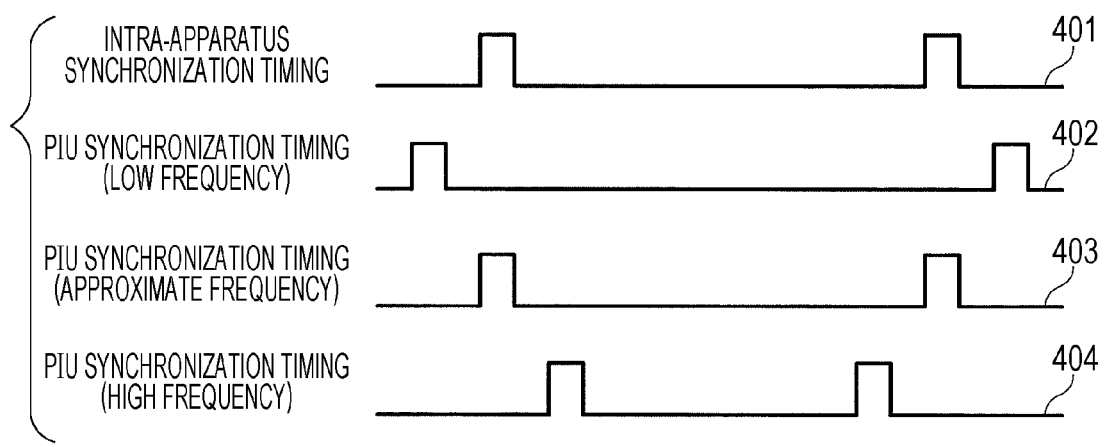
FIG. 4 is a diagram illustrating an example in which the frame pulse generated by the first plug-in unit is compared with a frame pulse generated by a second plug-in unit in the transmission apparatus according to the embodiment.

FIG. 4 is an explanatory diagram illustrating an example of comparison between the reference frame pulse signal 401 output from the intra-apparatus frame pulse generation circuit 207 and comparative frame pulse signals 402, 403, and 404 sent from the PIU 202 via the BWB 203. In the comparison between the reference frame pulse signal 401 and the comparative frame pulse signal 402, the frequency of the comparative frame pulse signal 402 is lower than that of the reference frame pulse signal 401. In addition, the reference frame pulse signal 401 is not synchronized with the comparative frame pulse signal 402. Therefore, the frequency difference detection circuit 208 outputs, to the control signal generation circuit 209, a signal indicating that the frequency of the comparative frame pulse signal is lower than that of the reference frame pulse signal and whether or not the comparative frame pulse signal is synchronized with the reference pulse signal. Specifically, a logical value signal that becomes 1 for representing synchronization and becomes 0 for representing non-synchronization can be used as the signal representing whether or not the comparative frame pulse signal is synchronized with the reference pulse signal. For example, the frequency difference detection circuit 208 outputs a negative value as a result of subtracting the frequency of the reference frame pulse signal 401 from the frequency of the comparative frame pulse signal 402. The frequency difference detection circuit 208 outputs 0 as the logical value signal representing that the comparative frame pulse is not synchronized with the reference frame pulse.

Since the reference frame pulse signal represents synchronization timing in the transmission apparatus 200, the reference frame pulse single is illustrated as "intra-apparatus synchronization timing" in FIG. 4. Similarly, since the comparative frame pulse signal represents synchronization timing in the PIU 202, the comparative frame pulse signal is illustrated as "PIU synchronization timing".

Next, if the reference frame pulse signal 401 and the comparative frame pulse signal 403 are compared with each other, the comparative frame pulse signal 403 has the same frequency as that of the reference frame pulse signal 401 or an approximate frequency to that of the reference frame pulse signal 401, and is also synchronized with the reference frame pulse signal 401. Therefore, the frequency difference detection circuit 208 outputs, to the control signal generation circuit 209, a signal representing that the comparative frame pulse signal 402 has the same frequency as that of the reference frame pulse signal 401 or an approximate frequency to that of the reference frame pulse signal 401 and is synchronized with the reference frame pulse signal 401. At this time, the frequency difference detection circuit 208 outputs 0 that is a result of subtracting the frequency of the reference pulse signal from the frequency of the comparative frame pulse signal and 1 as the logical value signal. The expression "synchronized" used herein means that a result of AND operation of pulses of two signals is not zero.

If the reference frame pulse signal 401 and the comparative frame pulse signal 404 are compared to each other, the frequency of the comparative frame pulse signal 404 is higher than that of the reference frame pulse signal 401. In addition, the reference frame pulse signal 401 is not synchronized with the comparative frame pulse signal 404. Therefore, the frequency difference detection circuit 208 outputs to the control signal generation circuit 209, a signal representing that the frequency of the comparative frame pulse signal 404 is higher than that of the reference frame pulse signal 401 and that the comparative frame pulse signal 404 is not synchronized with the reference pulse. Specifically, the frequency difference detection circuit 208 outputs a positive value as a result of subtracting the frequency of the reference frame pulse signal from the frequency of the comparative frame pulse signal and 0 as the logical value signal.

The frequency difference detection circuit 208 may include a phase counter and a frame counter to detect the phase difference between the reference pulse signal and the comparative frame pulse.

The phase counter measures a time length from the generation of the reference frame pulse to the generation of the comparative frame pulse between two reference frame pulses. The two reference frame pulses described herein means reference frame pulses that are temporally continuously generated and are temporally adjacent to each other. Therefore, the phase counter counts a pulse of a pulse signal at a higher frequency than those of the reference pulse signal and the comparative frame pulse signal, for example. A pulse at the same frequency as that of the signal output from the frequency dividing circuit 214 is counted, for example. The phase counter counts falling of the signal output from the frequency dividing circuit 214, the value is reset at the time of the falling of the reference frame pulse, and the count value is hold at the time of the falling of the comparative frame pulse.

Hereinafter, description will be given of a case where the frequency dividing circuit 214 in the aforementioned example outputs a signal of 38.88 MHz and the frequency of the reference frame pulse signal is 8 KHz. In such a case, the phase counter counts 0 to 4859.

The frame counter counts the number of frame pulses generated between the two reference frame pulses. The value of the frame counter is reset by the reference pulse. For example, the frame counter counts falling of the comparative frame pulse and is reset by falling of the reference pulse.

The frequency difference detection circuit 208 reads the value of the phase counter and the value of the frame counter when the reference frame pulse is generated. The frequency difference detection circuit 208 reads the value of the phase counter and the value of the frame counter immediately before the falling of the reference pulse, for example.

Figure 5:
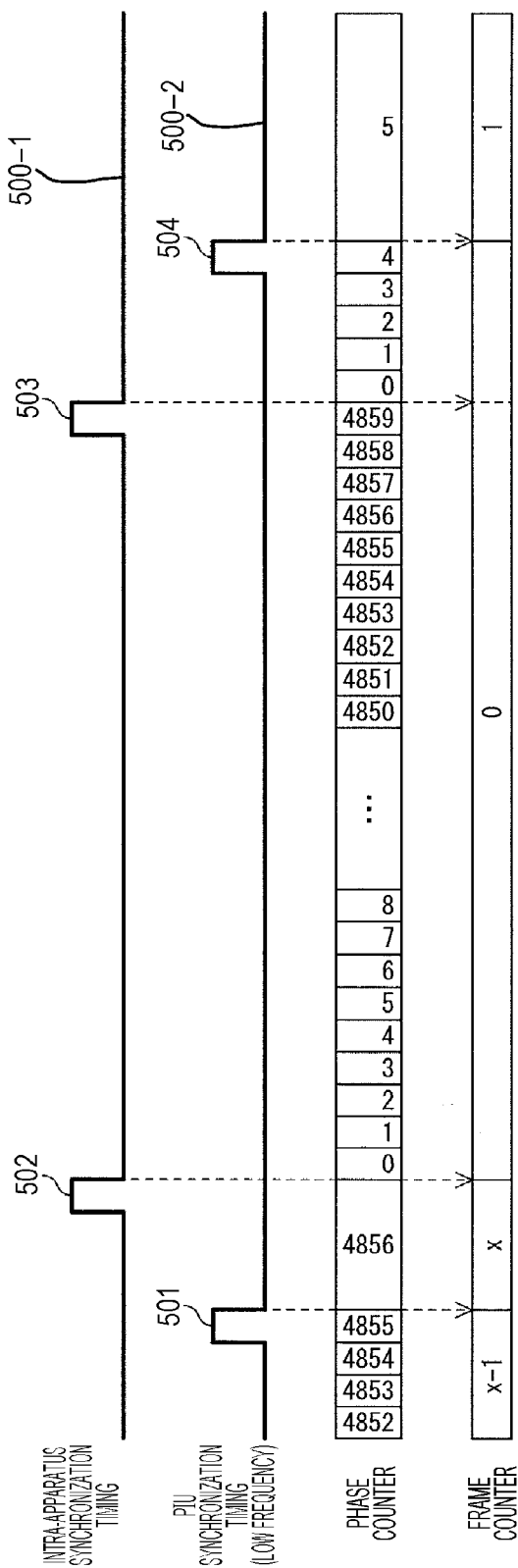
FIG. 5 is an explanatory diagram of comparison between the frame pulse generated by the first plug-in unit and the frame pulse generated by the second plug-in unit in the transmission apparatus according to the embodiment.

FIG. 5 is an explanatory diagram of an operation of the phase counter and an operation of the frame counter in a case where the frequency of the comparative frame pulse signal is lower than that of the reference pulse signal. Since the frequency of the comparative frame pulse signal is lower than that of the reference pulse signal in FIG. 5, no falling of the frame pulse is present between a reference frame pulse 502 and a reference frame pulse 503 in FIG. 5. In other words, the reference frame pulse 502 and the reference frame pulse 503 are present between the comparative frame pulse 501 and the comparative frame pulse 504.

Therefore, the phase counter is reset by the reference frame pulse 502, the counter value of the phase frame is reset to 0 again in the next reference frame pulse 503, and then the comparative frame pulse 504 is generated. Therefore, value smaller than 4959 are read as the values of the phase counter in the reference frame pulse following the reference frame pulse 503. In a case where the frequency of the comparative frame pulse signal is higher than that of the reference pulse signal (the frequency of the comparative frame pulse signal is smaller), the values of the phase counter read during the two continuous reference frame pulses typically tend to increase. The magnitude of the frequency can be detected by detecting such a tendency in the embodiment. An exception is a case where two reference frame pulses are present between the comparative frame pulses as illustrated in FIG. 5. In such a case, the values of the phase counter read during the two continuous reference pulses temporarily decreases.

The frame counter is reset by the reference frame pulse 503 and is counted up by the comparative frame pulse 504. The frequency difference detection circuit 208 reads the value of the frame counter in the reference frame pulse following the reference frame pulse 503. As a result, 1 is read. In a case where the frequency of the comparative frame pulse signal 205 is lower than that of the reference pulse signal, 0 or 1 is read as the value of the frame counter. Therefore, it is possible to make detection by comparison of a small number of bits and to thereby reduce a circuit scale.

Figure 6:
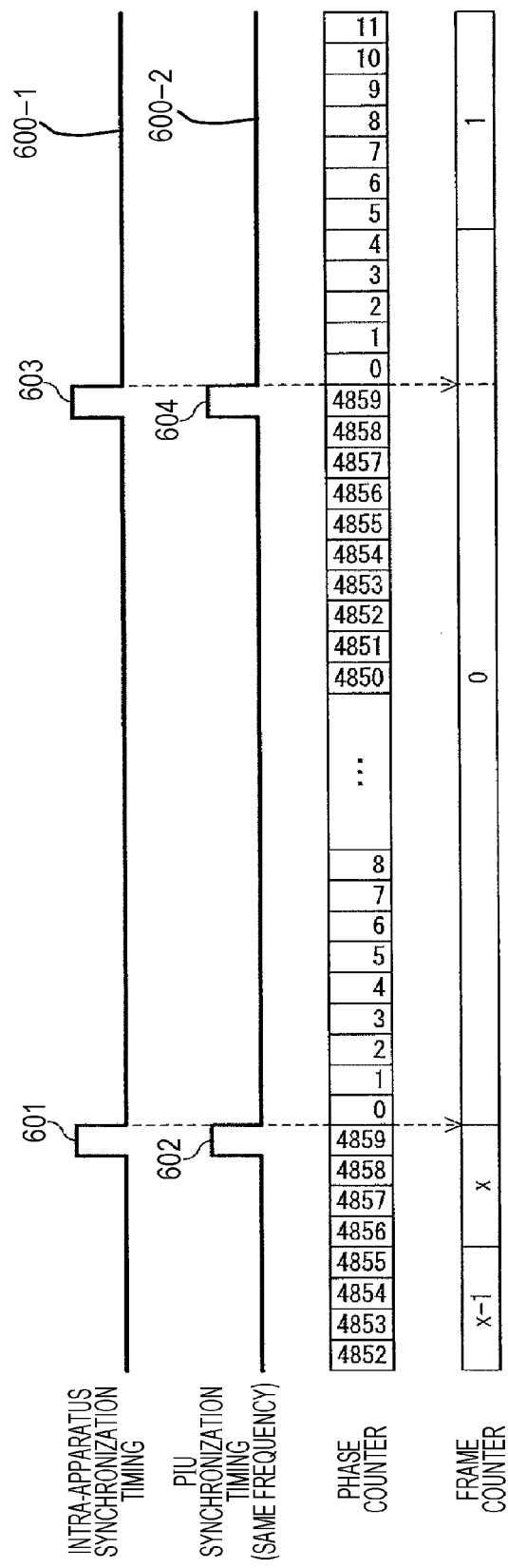
FIG. 6 is an explanatory diagram of comparison between the frame pulse generated by the first plug-in unit and the frame pulse generated by the second plug-in unit in the transmission apparatus according to the embodiment.

Next, FIG. 6 illustrates a case where the frequency of the reference frame pulse signal is equal to that of the comparative frame pulse signal and the reference frame pulse signal is synchronized with the comparative frame pulse signal. In such a case, a pulse 601 of the reference frame pulse signal matches a comparative frame pulse 602, and a reference frame pulse 603 matches a comparative frame pulse 604. For example, the frequency difference detection circuit 208 reads 4859 as a value of the phase counter and reads 0 as a value of the frame counter at the time of the falling of the comparative frame pulse 604.

Figure 7:
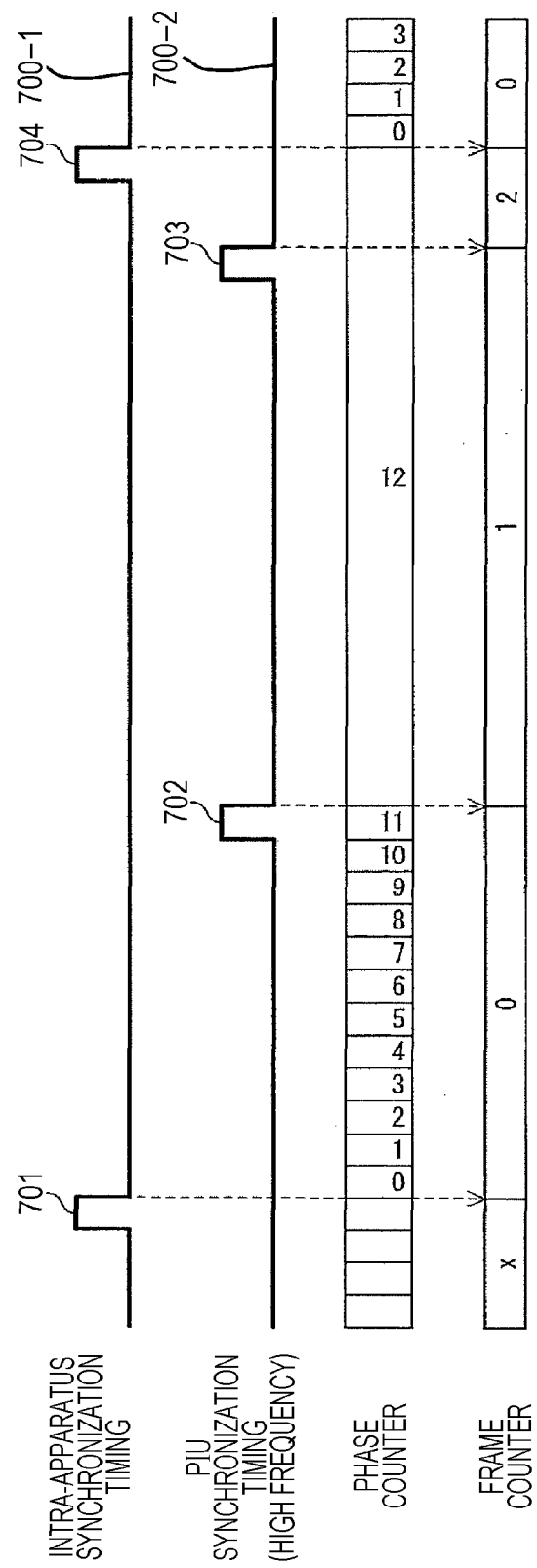
FIG. 7 is an explanatory diagram of comparison between the frame pulse generated by the first plug-in unit and the frame pulse generated by the second plug-in unit in the transmission apparatus according to the embodiment.

FIG. 7 is an explanatory diagram of an operation of the phase counter and an operation of the frame counter in a case where the frequency of the comparative frame pulse signal is higher than that of the reference frame pulse signal. Since the frequency of the comparative frame pulse signal is higher than that of the reference frame pulse signal in FIG. 7, two comparative frame pulses 702 and 703 are present between reference frame pulses 701 and 704. Therefore, it is possible to detect that the frequency of the comparative frame pulse signal is higher than that of the reference frame pulse signal if the value of the frame counter is equal to or greater than 2. It is possible to state that the values of the phase counter read during the two continuous reference pulses tends to decrease when the value of the frame counter is 0 or 1.

The phase counter will be referred to as a "first counter" and the frame counter will be referred to as a "second counter" in some cases.

The control signal generation circuit 209 receives a signal representing a phase difference between the reference frame pulse signal and the comparative frame pulse output from the frequency difference detection circuit 208 and generates a control signal including data for correcting the frame pulse to the PIU 202. The control signal generation circuit 209 sends the control signal to the PIU 202. In that respect, the control signal generation circuit 209 will be referred to as a "transmitter 209" or the "first transmitter" in some cases. The control signal can include data for setting of other parts that are not involved in the generation of the clock signal and the frame pulse signal by the PIU (such as commands and arguments) in addition to the data for correcting the frame pulse.

The control signal generation circuit 209 includes a control register 219, a frame counter 220, and a control frame generator 222. The control register 219 stores, as encoded data, a signal representing a frequency difference between the reference frame pulse signal and the comparative frame pulse signal output from the frequency difference detection circuit 208 and whether or not synchronization is established. The control register 219 can also store commands for setting of the PIU 202. The frame counter 220 counts the frame number applied to the control signal in accordance with a signal oscillated by an oscillator 221. The control frame generator 222 generates the control signal 204 by using the data stored in the control register 219 and the value of the frame counter 220 and sends the control signal 204 to the PIU 202.

Figure 8:
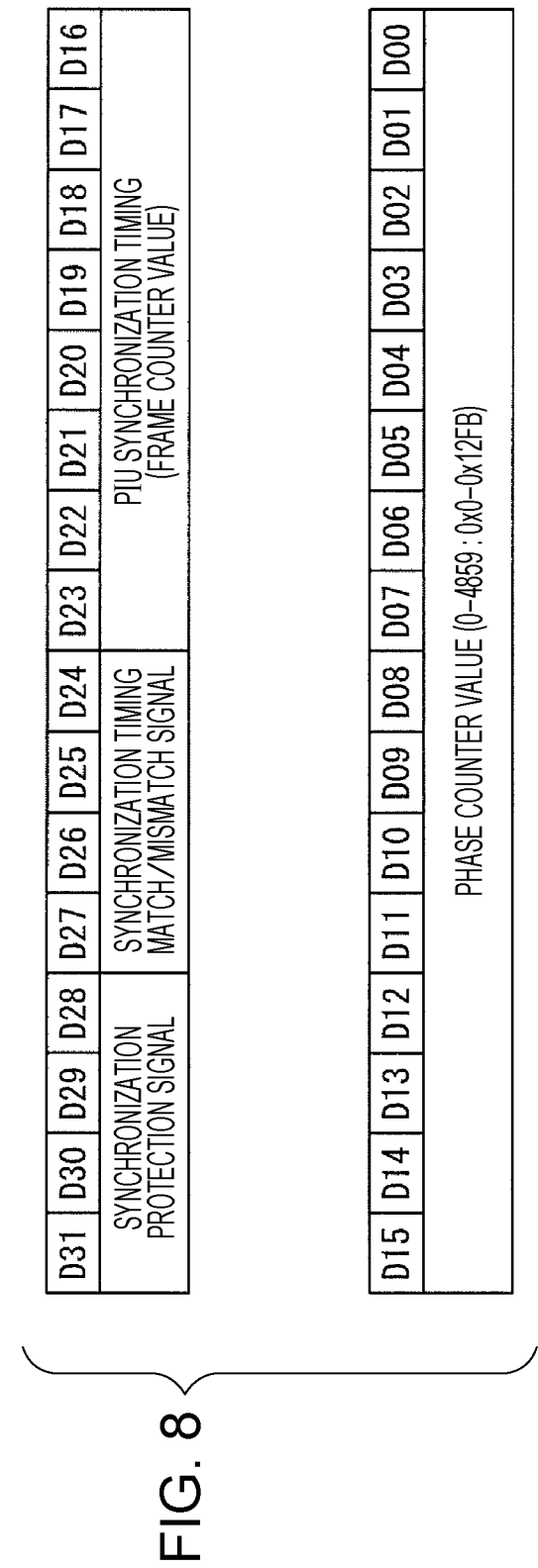
FIG. 8 is a diagram illustrating an example of a format of a control signal transmitted from the first plug-in unit to the second plug-in unit in the transmission apparatus according to the embodiment.

FIG. 8 illustrates an example of a format in which the control signal generation circuit 209 encodes the signal representing the phase difference output from the frequency difference detection circuit 208. The format illustrated as an example in FIG. 8 represents data of the encoded signal representing the frequency difference between the reference frame pulse signal and the comparative frame pulse signal and whether or not the synchronization is established. For example, the value of the phase counter is stored as a bit sequence representing a binary number in 16 bits from D00 to D15, and the value of the frame counter is stored as a bit sequence representing a binary number in 8 bits from D16 to D23. A value representing whether or not the reference frame pulse matches the comparative frame pulse (a value of synchronization timing match/mismatch signal) is stored as a bit sequence representing a binary number in four bits from D24 to D27. A value representing whether or not the reference frame pulse and the comparative frame pulse match each other in continuous pulses (three continuous pulses, for example) (a value of synchronization protection signal) is stored as a bit sequence representing a binary number in D28 to D31.

Figure 9:
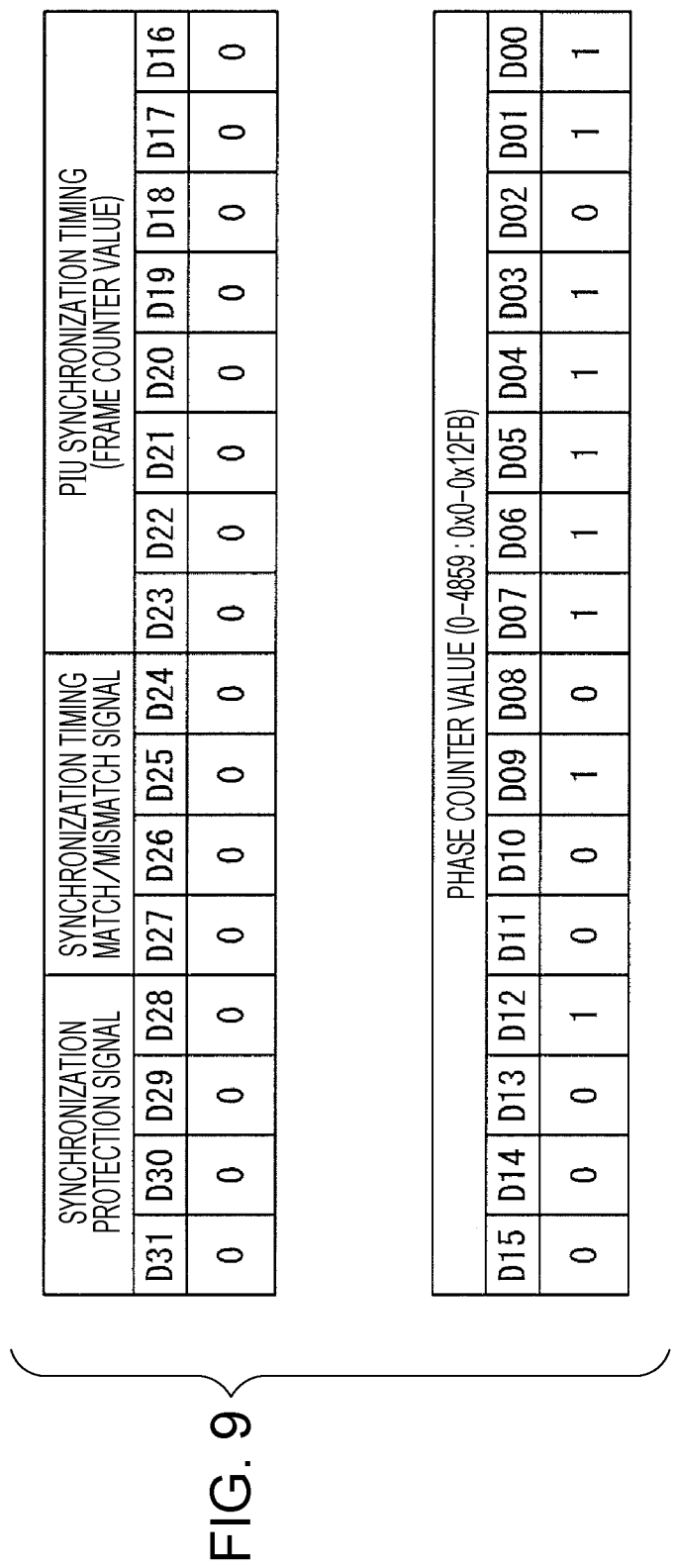
FIG. 9 is a diagram illustrating an example of the control signal transmitted from the first plug-in unit to the second plug-in unit in the transmission apparatus according to the embodiment.

FIG. 9 is a diagram illustrating an example of data of an encoded signal representing a frequency difference between a reference frame pulse signal 500-1 and a comparative frame pulse signal 500-2 and presence of synchronization in a case where the frequency of the comparative frame pulse signal 500-2 is lower than that of the reference frame pulse signal 500-1 as illustrated in FIG. 5. In such a case, a bit sequence that is obtained by encoding the value of the phase counter with a binary number and is not zero is stored in D00 to D15, and a bit sequence that is obtained by encoding the value of the frame counter with a binary number and represents 0 or 1 is stored in D16 to D23. A bit sequence that represents whether or not the reference frame pulses 502 and 503 match the comparative frame pulses 501 and 504 and is obtained by encoding 0 is stored in D24 to D27. A bit sequence that represents whether or not the reference frame pulses 502 and 503 match the comparative frame pulses 501 and 504 in the plurality of following pulses and is obtained by encoding 0 is stored in D28 to D31.

Figure 10:
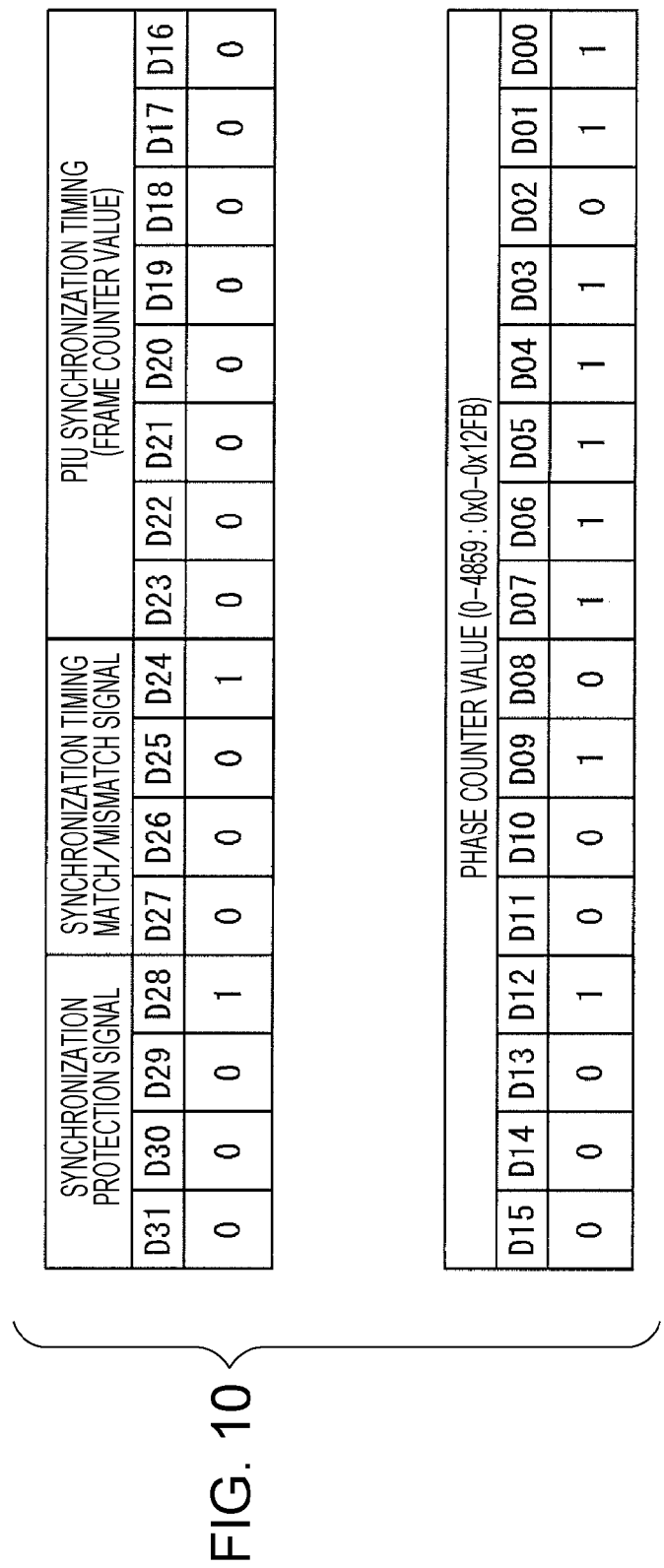
FIG. 10 is an example illustrating an example of the control signal transmitted from the first plug-in unit to the second plug-in unit in the transmission apparatus according to the embodiment.

FIG. 10 is a diagram illustrating an example of data of an encoded signal representing a frequency difference between a reference frame pulse signal 600-1 and a comparative frame pulse signal 600-2 and presence of synchronization in a case where the frequency of the comparative frame pulse signal 600-2 is the same as that of the reference frame pulse signal 600-1 and the comparative frame pulse signal 600-2 is synchronized with the reference frame pulse signal 600-1 as illustrated in FIG. 6. In the case of FIG. 10, the frequency of the reference frame pulse signal 600-1 matches the frequency of the comparative frame pulse signal 600-2, and the reference frame pulse signal 600-1 is synchronized with the comparative frame pulse signal 600-2 in the case where the comparative frame pulses 602 and 604 are synchronized with and match the reference pulses 601 and 603. Therefore, encoded 1 is stored in D24 to D27, and encoded 1 is also stored in D28 to D31.

Figure 11:
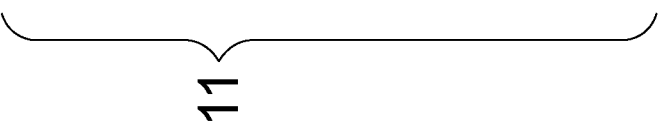
FIG. 11 is an example illustrating an example of the control signal transmitted from the first plug-in unit to the second plug-in unit in the transmission apparatus according to the embodiment.

FIG. 11 is a diagram illustrating an example of data of an encoded signal representing a frequency difference between a reference frame pulse signal 700-1 and a comparative frame pulse signal 700-2 and presence of synchronization in a case where the frequency of the comparative frame pulse signal 700-2 is higher than that of the reference pulse signal 700-1 as illustrated in FIG. 7. In such a case, a bit sequence representing a value that is obtained by encoding the value of the phase counter with a binary number and is not 0 is stored in D00 to D15, and a bit sequence obtained by encoding the value of equal to or greater than 1, as a value of the frame counter, with a binary number is stored in D16 to D23. A bit sequence that represents whether the reference frame pulses 701 and 704 matches the comparative frame pulses 701 and 704 and is obtained by encoding 0 with a binary number is stored in D24 to D27. A bit sequence that represents whether or not the reference frame pulses 701 and 704 match the comparative frame pulses 701 and 704 in the following plurality of pulses and is obtained by encoding 0 with a binary number is stored in D28 to D31.

Figure 12:
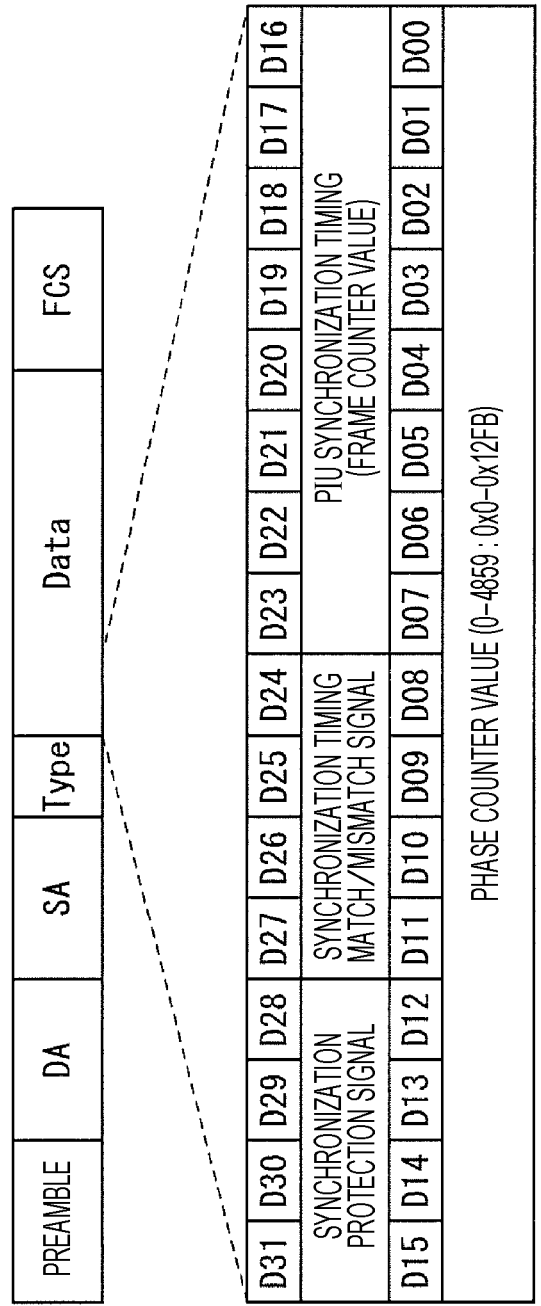
FIG. 12 is a diagram illustrating an example of the format of the control signal transmitted from the first plug-in unit to the second plug-in unit in the transmission apparatus according to the embodiment.

FIG. 12 is a diagram illustrating an example of a format of a control signal sent by the control signal generation circuit 209 to the PIU 202. As illustrated in FIG. 12, the control signal includes a preamble representing a frame synchronization signal, a Destination Address (DA) representing an address of a destination plug-in unit, a Source Address (SA) representing an address of a source plug-in unit, and a Type field representing meaning (type) of data included in the control signal. The control signal includes data of encoded signal representing a frequency difference between the reference frame pulse signal and the comparative frame pulse signal in the format illustrated in FIG. 8 and presence of synchronization as data (payload data). The payload data can include commands for performing setting for or sending inquiries to components, which are not illustrated in FIG. 12, in the PIU 202. In doing so, it is possible to reduce the amount of communication between the MCU 201 and the PIU 202. A Frame Check Sequence (FCS) is arranged after the payload data. In addition, a frame number which is not illustrated in FIG. 12 is included in the control signal. Cyclic Redundancy Check (CRC) illustrated in FIG. 13 may be used as the FCS.

Figure 13:
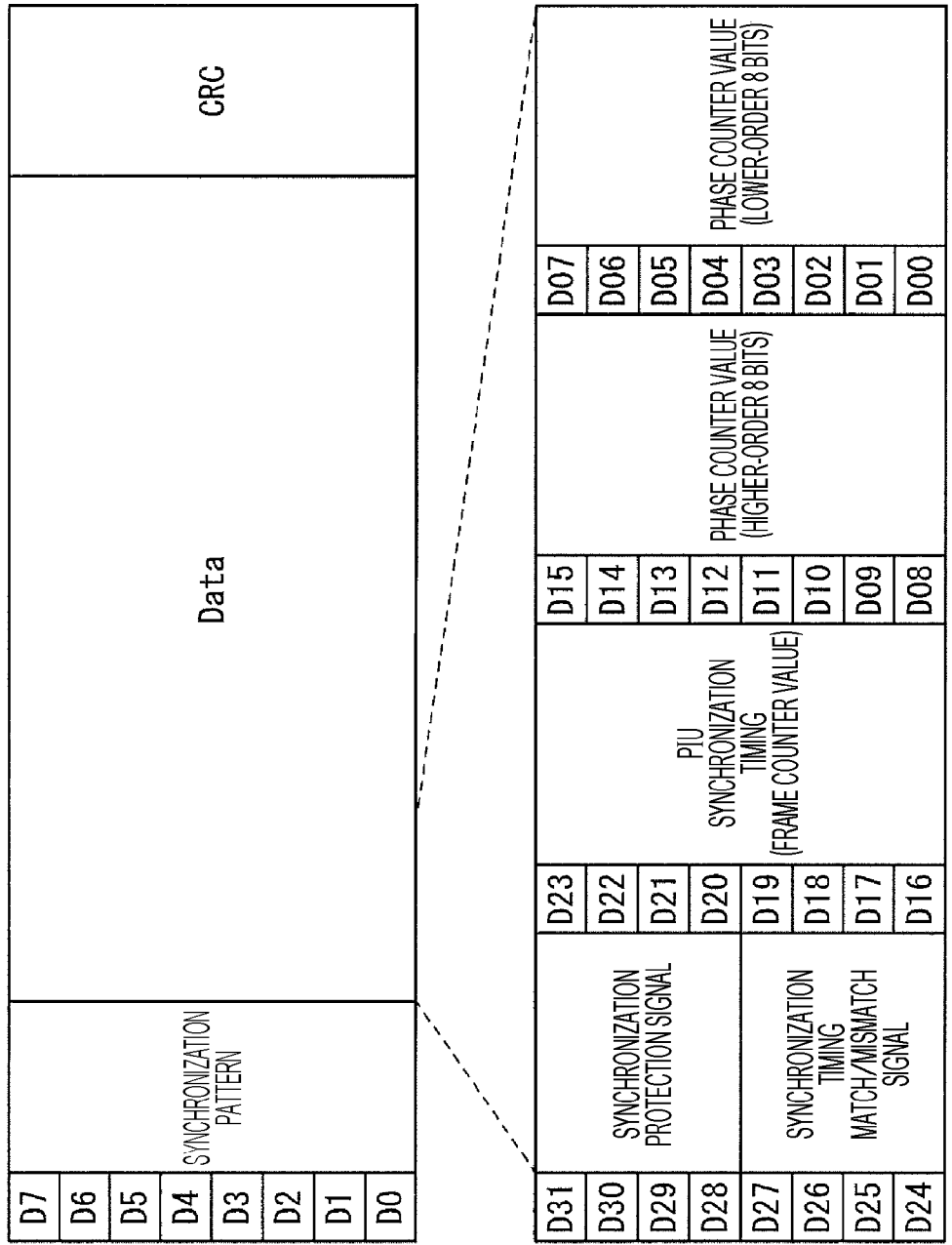
FIG. 13 is a diagram illustrating an example of the format of the control signal transmitted from the first plug-in unit to the second plug-in unit in the transmission apparatus according to the embodiment.

FIG. 13 is a diagram illustrating an example of another format of the control signal sent by the control signal generation circuit 209 to the PIU 202. FIG. 12 illustrates a case where the control signal is sent as serial data while FIG. 13 illustrates a case where the control signal is sent as parallel data. As illustrated in FIG. 13, a synchronization pattern corresponding to a preamble is arranged first, and payload data is arranged next. The payload data includes data of an encoded signal representing a frequency difference between the reference frame pulse signal and the comparative frame pulse signal in the format illustrated in FIG. 8 and presence of synchronization. The payload data can also include commands for performing setting for and sending inquires to components, which are not illustrated in FIG. 13, in the PIU 202. CRC representing a check sum or the like is arranged after the payload data.

FIGS. 8 to 13 were described on the assumption that the value of the phase counter and the value of the frame counter in the MCU 201 are directly included in the control signal 204. However, the disclosure is not limited thereto. For example, the MCU 201 may encode a corrected value calculated based on the value of the phase counter and the value of the frame counter and then include the encoded corrected value in the control signal 204. The encoded corrected value is information of the encoded corrected value of the frequency of the comparative frame pulse signal generated by the PIU 202. For example, the MCU 201 may use the phase counter and the frame counter to detect a difference between the frequencies of the reference frame pulse signal and the comparative frame pulse signal and encode the corrected value. Specifically, a positive value is encoded if the frequency of the comparative frame pulse signal is higher than that of the reference frame pulse signal. 0 is encoded if the frequency of the reference frame pulse signal is the same as the frequency of the comparative frame pulse signal. A negative value is encoded if the frequency of the comparative frame pulse signal is lower than that of the reference frame pulse signal. Here, each of the positive value and the negative value may be a fixed value or a value that varies in accordance with a frequency difference between the reference frame pulse signal and the comparative frame pulse signal. In doing so, it is possible to increase the variation in the comparative frame pulse signal when the frequency difference between the reference frame pulse signal and the comparative frame pulse signal is large. Therefore, it is possible to reduce time spent for synchronization.

Returning to FIG. 2, description will be given of the PIU 202 next. The PIU 202 includes a control signal receiving circuit 223, a frequency difference code value conversion circuit 224, an intra-PIU reference clock generation circuit 225, and an intra-PIU frame pulse generation circuit 226.

The control signal receiving circuit 223 receives a control signal sent from the MCU 201, extracts a signal for controlling a phase of a frame pulse, and outputs the signal to the frequency difference code value conversion circuit 224.

The control signal receiving circuit 223 receives the control signal sent from the MCU 201, extracts control information for setting the PIU 202, for example, and outputs the control information to the respective components in the PIU 202. The control signal receiving circuit 223 will also be referred to as a "receiver" in some cases.

The control signal receiving circuit 223 includes a control frame receiver 227 and a control register 228. The control frame receiver 227 receives the control signal 204. The control register 228 stores phase difference information extracted from the control signal 204.

The control signal receiving circuit 223 may be configured to use a pulse signal oscillated by an oscillator 229 to establish synchronization with the control signal generation circuit 209 and receive the control signal. The oscillator 229 can also be used to generate a frame number to be applied to a frame when the frame is sent from the PIU 202 to another plug-in unit. In a case where the PIU 202 receives the control signal from the MCU 201, for example, a value obtained by the oscillator 229 counting a pulse signal may be used as the frame number to be applied to the frame including response information thereof.

The frequency difference code value conversion circuit 224 converts the phase difference information stored in the control register 228 into data for controlling a clock frequency oscillated in the PIU 202 and outputs the data to the intra-PIU reference clock generation circuit 225. For example, the frequency difference code value conversion circuit 224 converts data for controlling the frequency of the comparative frame pulse signal included in the control signal into a signal for controlling a phase of a clock generated by the intra-PIU reference clock generation circuit 225 and outputs the signal to the intra-PIU reference clock generation circuit 225. The data for controlling the frequency of the comparative frame pulse signal includes a synchronization protection signal, a synchronization timing match/mismatch signal, a value of the frame counter, and a value of the phase counter. The synchronization timing match/mismatch signal is a signal indicating whether or not the synchronization timing matches.

The frequency difference code value conversion circuit 224 generates data for maintaining the current frequency of the clock signal generated by the intra-PIU reference clock generation circuit 225 if the synchronization protection signal is 1. The frequency difference code value conversion circuit 224 generates data for adjusting the clock signal generated by the intra-PIU reference clock generation circuit 225 in a case where the synchronization protection signal is not 1 and the reference frame pulse matches the comparative frame pulse. The data for adjusting the clock signal is generated based on the value of the frame counter and the value of the phase counter. If the value of the frame counter is not 0, data of increasing the frequency of the clock signal generated by the intra-PIU reference clock generation circuit 225 is generated. In a case where the value of the frame counter is 0 and values of the phase counter increase in two continuously sent control signals, data for increasing the frequency of the clock signal generated by the intra-PIU reference clock generation circuit 225 is generated. If values of the phase counter decrease or are the same in two continuously sent control signals, data for reducing the frequency of the clock signal generated by the intra-PIU reference clock generation circuit 225 is generated. The frequency difference code value conversion circuit 224 will also be referred to as a "controller" in some cases since the frequency difference code value conversion circuit 224 controls the frequency of the clock signal generated by the intra-PIU reference clock generation circuit 225.

The intra-PIU reference clock generation circuit 225 generates the reference clock signal (intra-PIU reference clock signal) used by the PIU 202 as described above. The intra-PIU reference clock generation circuit 225 controls the frequency of the PIU reference clock signal in accordance with a signal for controlling a phase output from the frequency difference code value conversion circuit 224 when the intra-PIU reference clock signal is generated. Specifically, the intra-PIU reference clock generation circuit 225 includes a DAC 230, a VCXO 231, and a frequency dividing circuit 232.

The DAC 230 converts data output from the frequency difference code value conversion circuit 224 into analog data. Specifically, the DAC 230 generates a voltage signal in accordance with a value represented by digital data output from the frequency difference code value conversion circuit 224 and outputs the voltage signal to the VCXO 231.

The VCXO 231 oscillates a signal at a frequency in accordance with the voltage signal output from the DAC 230 and outputs the signal to the frequency dividing circuit 232.

The frequency dividing circuit 232 divides frequency of the signal output from the VCXO 231. The signal after being subjected to the frequency division is output to the intra-PIU frame pulse generation circuit 226 and the respective components in the PIU as the intra-PIU reference clock signal.

In a case where the frequency of the comparative frame pulse signal is lower than that of the reference frame pulse signal, for example, the frequency difference code value conversion circuit 224 sets a value to be output to the DAC 230 to be greater than a current value. In a case of maintaining the frequency of the frame pulse signal, the frequency difference code value conversion circuit 224 sets the value to be output to the DAC 230 to the current value. In a case where the frequency of the comparative frame pulse signal is higher than that of the reference frame pulse signal, the frequency difference code value conversion circuit 224 sets the value to be output to the DAC 230 to be smaller than the current value.

Figure 14:
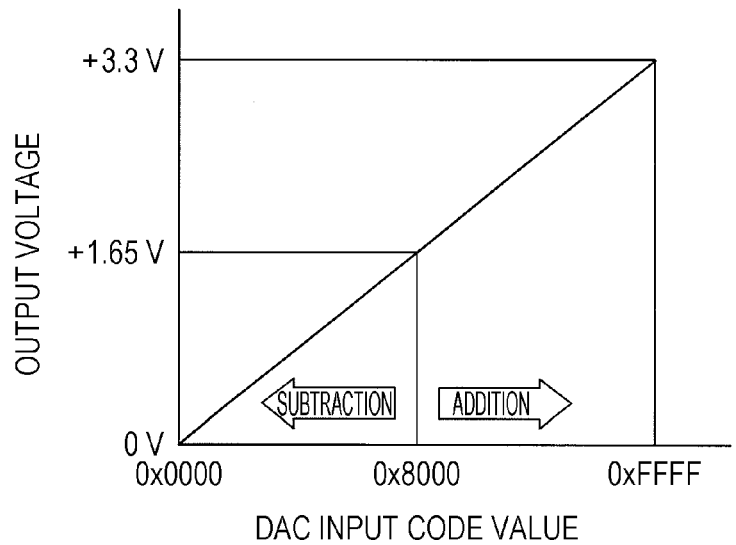
FIG. 14 is an explanatory diagram of control performed on a clock generated by the second plug-in unit of the transmission apparatus according to the embodiment.

More specifically, the frequency difference code value conversion circuit 224 operates as illustrated in FIG. 14. It is assumed that the frequency difference code value conversion circuit 224 outputs codes from 0x0000 to 0xFFFF and the DAC 230 outputs voltage signals in accordance with 0x0000 to 0xFFFF to the VCXO 231. In such a case, the frequency difference code value conversion circuit 224 outputs 0x8000 as a substantially intermediate value from 0x0000 to 0xFFFF, for example, in an initial state after the PIU 202 starts the operation and until the PIU 202 receives the control signal from the MCU 201. In doing so, the DAC 230 applies an intermediate voltage signal of 1.65 V between 0 V and 3.3 V to the VCXO 231. The VCXO 231 performs oscillation at a predetermined frequency in response to the application of the intermediate voltage signal of 1.65 V, which is between 0 V and 3.3 V. The predetermined frequency can be the same as or approximate to the oscillation frequency of the VCXO 213.

Thereafter, if the control signal is received from the MCU 201, then the frequency difference code value conversion circuit 224 increases the value to be output in a case where the frequency of the comparative frame pulse signal is lower than that of the reference frame pulse signal. For example, a value obtained by adding a positive value to the current output value is set as the output value. In contrast, in a case where the frequency of the comparative frame pulse signal is higher than that of the reference frame pulse signal, a value obtained by subtracting a positive value from the current output value is set as the output value. By controlling the value to be output to the DAC 230 as described above, the comparative frame pulse signal can be synchronized with the reference frame pulse signal.

The positive value described herein may not be a fixed value. The MCU 201 or the PIU 202 may change the aforementioned positive value in accordance with the magnitude of the frequency of the comparative frame pulse signal with respect to the frequency of the reference frame pulse signal, for example. In a case where the frequency of the comparative frame pulse signal is approximate to that of the reference frame pulse signal, for example, the positive value is set to be smaller than that in a case where the frequency of the comparative frame pulse signal is greatly different from that of the reference frame pulse signal. In doing so, it is possible to reduce the variations in the frequency of the comparative frame pulse signal in the case where the frequency of the comparative frame pulse signal is approximate to that of the reference frame pulse signal. Therefore, it is possible to reduce the time spent for synchronization.

The intra-PIU frame pulse generation circuit 226 generates a comparative frame pulse signal from an intra-PIU reference clock signal. The generated comparative frame pulse signal is output to the respective components in the PIU and is sent to the MCU 201 via the BWB 203. The intra-PIU frame pulse generation circuit 226 will also be referred to as a "second frame pulse generator". The component that sends the generated comparative frame pulse signal to the MCU 201 via the BWB 203 will also be referred to as a "second transmitter".

The intra-PIU frame pulse generation circuit 226 includes a frequency dividing circuit 233 and a decoder 234.

The frequency dividing circuit 233 divides the frequency of the intra-PIU reference clock signal and outputs a frequency-divided signal obtained as a result to the decoder 234.

The decoder 234 generates a comparative frame pulse signal from the frequency-divided signal output from the frequency dividing circuit 233 and outputs the comparative frame pulse signal to the respective components in the PIU 202 and the MCU 201.

As described above, each of the MCU 201 and the PIU 202 generates a frame pulse as described above in the embodiment. The comparative frame pulse generated by the PIU 202 is sent to the MCU 201 and is then compared with the reference frame pulse generated by the MCU 201. The result of the comparison is encoded and included in the control signal output from the MCU 201 to the PIU 202 and is fed back to the PIU 202. The PIU 202 corrects the frequency of the intra-PIU reference clock in accordance with the feedback. In doing so, the clock signals generated by the MCU 201 and the PIU 202, respectively, are synchronized, and the frame pulses are also synchronized.

In the aforementioned configuration, the frame pulse is output from the PIU 202 to the MCU 201, and control signals are sent and received in both directions between the MCU 201 and the PIU 202. Therefore, separate signal lines may not be used for controlling the phases of the clock signal and the frame pulse generated by the PIU 202. As a result, it is possible to reduce the number of signal lines between the MCU 201 and the PIU 202. In addition, it is possible to reduce the number of connector pins and to thereby downsize the connectors. Accordingly, it is possible to downsize the plug-in unit and the transmission apparatus.

In the aforementioned embodiment, the frequencies of the reference frame pulse signal and the comparative frame pulse signal may be variable. For example, if it is detected that the reference frame pulse signal and the comparative frame pulse signal have been brought into a synchronized state from a non-synchronized state, the frequencies of the reference frame pulse signal and the comparative frame pulse signal are set to be lower. For example, the frequencies of the reference frame pulse signal and the comparative frame pulse signal are set to be ½ or ¼. It is possible to set the frequencies of the reference frame pulse signal and the comparative frame pulse signal to be high before the detection of the synchronization by setting the frequencies of the reference frame pulse signal and the comparative frame pulse signal to be lower if it is detected that the reference frame pulse signal and the comparative frame pulse signal have been brought into a synchronized state. In doing so, it is possible to increase the number of times the phase difference between the reference frame pulse signal and the comparative frame pulse signal is detected. Therefore, it is possible to reduce time spent for synchronization.

Figure 15:
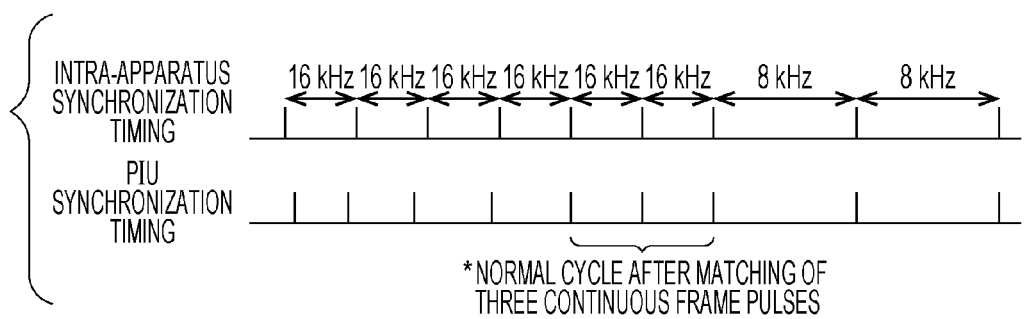
FIG. 15 is an explanatory diagram of comparison between the frame pulse generated by the first plug-in unit and the frame pulse generated by the second plug-in unit in the transmission apparatus according to the embodiment.

FIG. 15 is a diagram illustrating an example in which the frequencies of the reference frame pulse and the comparative frame pulse are set to ½ if it is detected that the reference frame pulse signal and the comparative frame pulse signal have been brought into the synchronized state from the non-synchronized state. As illustrated in FIG. 15, the frequency of the reference frame pulse signal is set to 16 KHz while the reference frame pulse does not match the comparative frame pulse. If three temporally continuously generated reference frame pulses match three temporally continuously generated comparative frame pulses, the frequencies of the reference frame pulse signal and the comparative frame pulse signal are set to ½, that is, 8 KHz.

Such a change of the frequency of the reference frame pulse signal can be realized by changing the setting of the decoder 217 if the frequency difference detection circuit 208 detects establishment of synchronization. The frequency of the comparative frame pulse signal can be changed by changing the setting of the decoder 234 if the frequency difference code value conversion circuit 224 detects establishment of synchronization.

[Example of Operations]

Figure 16:
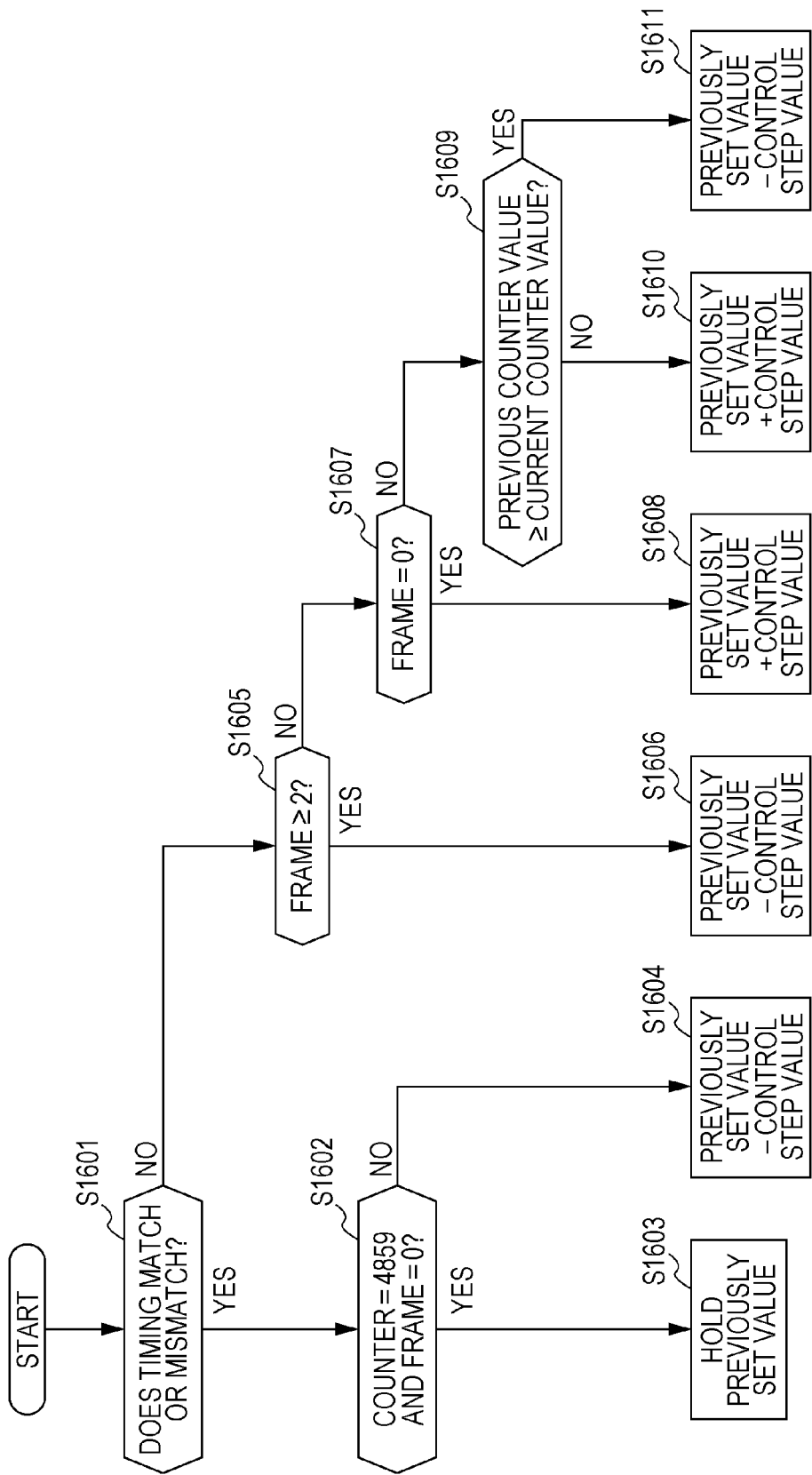
FIG. 16 is a diagram illustrating an example of processing performed by the first plug-in unit of the transmission apparatus according to the embodiment.

FIG. 16 is an explanatory flowchart of operations of frequency difference code value conversion circuit 224 in an example according to the disclosure. The processing in the flowchart of FIG. 16 is executed in a case where the synchronization protection signal is not 1.

As the processing in Operation S1601, it is determined whether or not timing of the pulse of the reference frame pulse signal matches the timing of the pulse of the comparative frame pulse signal by a value of the match/mismatch signal. If the timing of the pulse of the reference frame pulse signal matches the timing of the pulse of the comparative frame pulse signal (Yes in Operation S1601), the processing proceeds to Operation S1602. If the timing of the pulse of the reference frame pulse signal does not match the timing of the pulse of the comparative frame pulse signal (No in Operation S1601), the processing proceeds to Operation S1605.

As the processing in Operation S1602 in the case of Yes in Operation S1601, it is determined whether the value of the phase counter is 4859, for example, and the value of the frame counter is 0. In the case of Yes in Operation S1602, the processing proceeds to Operation S1603. In the case of No in Operation S1602, the processing proceeds to Operation S1604.

In processing in Operation S1603 in the case of Yes in Operation S1602, setting is made such that a value to be output to the DAC 230 is maintained. This is because there can be a case where the reference frame pulse signal is synchronized with the comparative frame pulse signal in the case of Operation S1603. In the case where the reference frame pulse signal is not synchronized with the comparative frame pulse signal, the processing is branched to No from the processing in Operation S1601 next time when the flowchart in FIG. 16 is executed, and the processing proceeds to Operation S1605.

In processing in Operation S1604 in the case of No in Operation S1602, the value to be output to the DAC 230 is reduced by a predetermined number (a control step value, for example) since there is a case where the frequency of the comparative frame pulse signal is higher than that of the reference frame pulse signal. In a case where the frequency of the comparative frame pulse signal is not higher than that of the reference frame pulse signal, the processing is branched to No from the processing in Operation S1601 next time when the flowchart in FIG. 16 is executed, and the processing proceeds to Operation S1605. The control step value is a value of the phase frame counter. Therefore, it is possible to directly use the value of the phase frame counter and to simplify the configuration of the circuit in the embodiment.

In processing in Operation S1605, it is determined whether or not the value of the frame counter is equal to or greater than 2. If the value of the frame counter is equal to or greater than 2 (Yes in Operation S1605), this means that the frequency of the comparative frame pulse signal is higher. Thus, the processing proceeds to Operation S1606. If the value of the frame counter is less than 2 (No in Operation S1605), the processing proceeds to Operation S1607.

In processing in Operation S1606 in the case of Yes in Operation S1605, the value to be output to the DAC 230 is reduced by a predetermined value (a control step value, for example).

In processing in Operation S1607 in the case of No in Operation S1605, it is determined whether or not the value of the frame counter is 0. If the value of the frame counter is 0 (Yes in Operation S1607), the processing proceeds to Operation S1608. If the value of the frame counter is not 0 (No in Operation S1607), the processing proceeds to Operation S1609.

In Processing in Operation S1608 in the case of Yes in Operation S1607, the value to be output to the DAC 230 is increased by a predetermined value (a control step value, for example).

In processing in Operation S1609 in the case of No in Operation S1607, a previous value of the frame counter (a value of the frame counter when the last processing in the flowchart in FIG. 16 is completed) is compared with the current value of the frame counter. If the previous value of the frame counter is smaller (Yes in Operation S1609), the processing proceeds to Operation S1611. If the previous value of the frame counter is smaller (No in Operation S1609), the processing proceeds to Operation S1610.

In processing in Operation S1610 in the case of No in Operation S1609, the value to be output to the DAC 230 is increased by a predetermined value (a control step value, for example).

In processing in Operation S1611 in the case of Yes in Operation S1609, the value to be output to the DAC 230 is reduced by a predetermined value (a control step value, for example).

Figure 17:
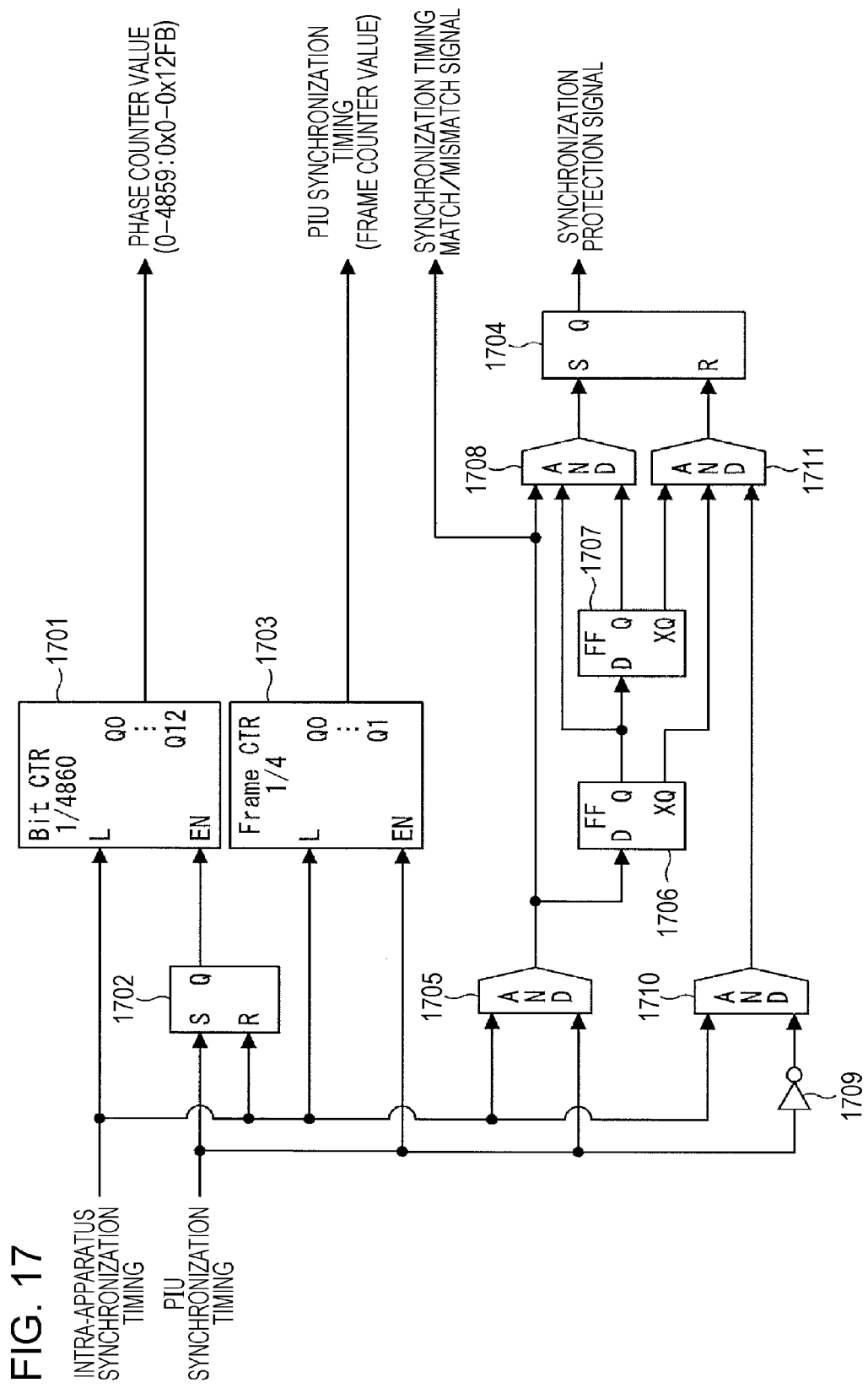
FIG. 17 is a diagram illustrating an example of a configuration of a frequency difference detection circuit provided in the first plug-in unit of the transmission apparatus according to the embodiment.

FIG. 17 is a diagram illustrating an example of the phase counter and the frame counter.

A reference frame pulse signal is input to a phase counter 1701, and the phase counter 1701 is reset in accordance with falling of a pulse of the reference frame pulse signal. The phase counter 1701 measures time from occurrence of the pulse of the reference frame pulse signal to occurrence of the pulse of the comparative frame pulse signal. In order to do so, a signal obtained by inputting the reference frame pulse signal and the comparative frame pulse signal to an SR flip-flop 1702 is input to the phase counter 1701. The SR flip-flop 1702 is set in accordance with the reference frame pulse signal and is set in accordance with the comparative frame pulse signal. In doing so, it is possible to output pulses such that the number of the pulses is proportional to the time length from the occurrence of the pulse of the reference frame pulse signal to the occurrence of the comparative frame pulse signal.

A reference frame pulse signal is input to a frame counter 1703, and the frame counter 1703 is reset in accordance with falling of a pulse of the reference frame pulse signal. The frame counter 1703 counts the number of comparative frame pulses after the occurrence of the reference frame pulse.

An SR flip-flop 1704 outputs whether or not three continuous pulses of the reference frame pulse signal match three continuous pulses of the comparative frame pulse signal and whether synchronization is present. That is, the SR flip-flop 1704 outputs a synchronization protection signal.

In order to form an input to the SR flip-flop 1704, an AND circuit 1705 outputs 1 in a case where the pulse of the reference frame pulse signal and the pulse of the comparative frame pulse signal have occurred at the same time. That is, the AND circuit 1705 outputs a synchronization timing match/mismatch signal. The output from the AND 1705 circuit is input to a flip-flop 1706 that stores the condition that the pulse of the reference frame pulse signal and the pulse of the comparative frame pulse signal have occurred at the same time. One of outputs form the flip-flop 1706 is input to a flip-flop 1707 that stores the condition that pulse of the reference frame pulse signal and the pulse of the comparative frame pulse signal have occurred at the same time twice. Outputs from the AND circuit 1705, the flip-flop 1706, and the flip-flop 1707 are input to an AND circuit 1708. In doing so, an output is sent to the AND circuit 1708 that detects that the three continuous pulses of the reference frame pulse signal has matched three continuous pulses of the comparative frame pulse signal. The AND circuit 1708 sends an output to the SR flip-flop 1704.

A condition that three continuous pulses of the reference frame pulse signal has not matched three continuous pulses of the comparative frame pulse signal is detected. In order to do so, the pulse signal of the reference frame pulse and NOT of the comparative frame pulse signal by a NOT circuit 1709 is input to the AND circuit 1710. An output XQ from the flip-flop 1707, an output XQ from the flip-flop 1706, and an output from the AND circuit 1710 are input to an AND circuit 1711. An output from the AND circuit 1711 functions as a reset signal for the SR flip-flop 1704. In doing so, the SR flip-flop 1704 is reset in a case where three continuous pulses of the reference frame pulse signal has not matched at least one of three continuous pulses of the comparative frame pulse signal.

Figure 18:
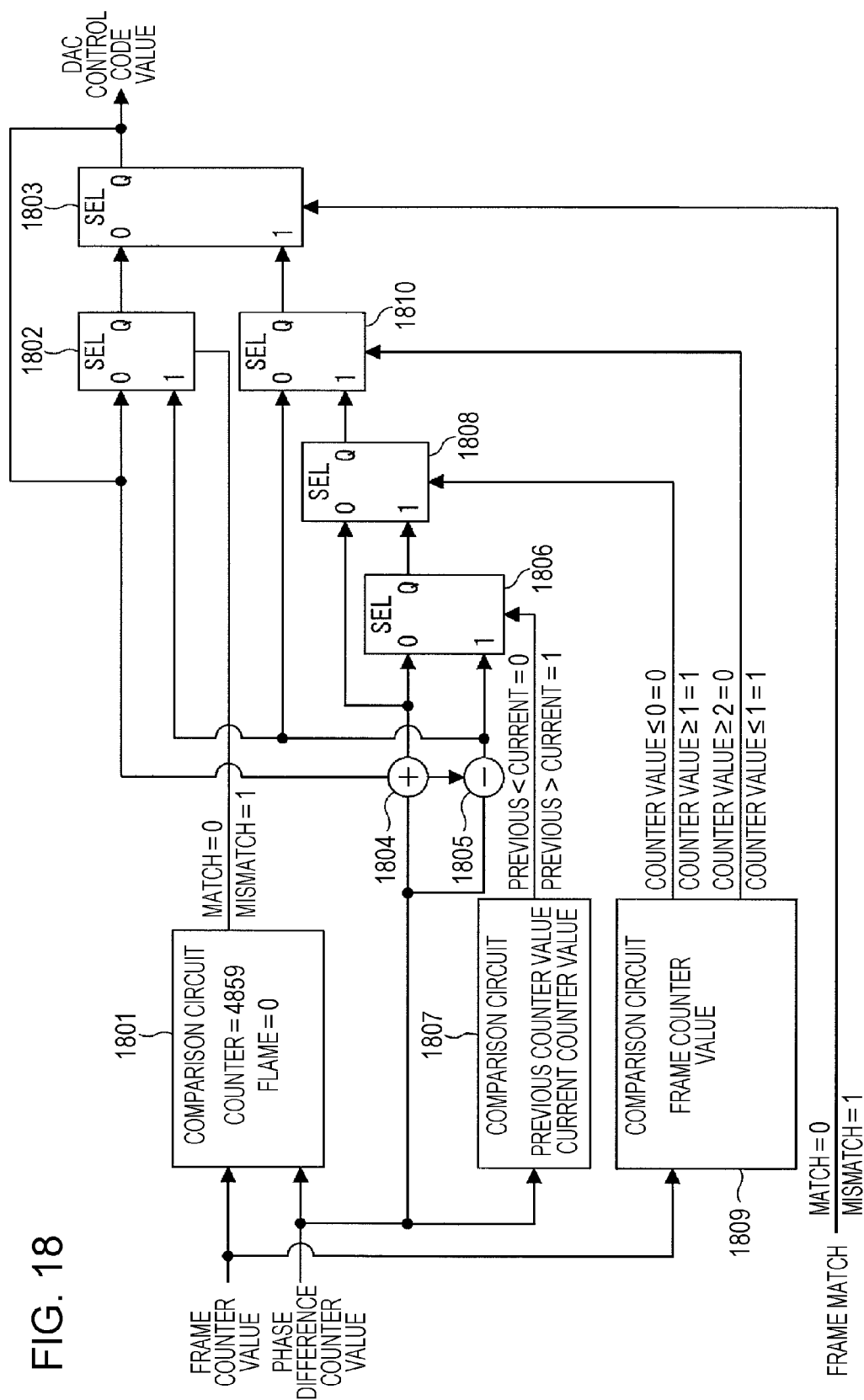
FIG. 18 is a diagram illustrating an example of a configuration of a frequency difference code value conversion circuit provided in the second plug-in unit of the transmission apparatus according to the embodiment.

FIG. 18 is an example of a circuit diagram for realizing the processing in the flowchart illustrated in FIG. 16.

A selection circuit 1803 realizes the processing in Operation S1601. If the pulse of the reference frame pulse signal matches the pulse of the comparative frame pulse signal, an input 0 is output as an output Q. If the pulse of the reference frame pulse signal does not match the pulse of the comparative frame pulse signal, an input 1 is output as an output Q.

A selection circuit 1802 realizes the processing in Operation S1602. If the value of the phase counter is 4859 and the value of the frame counter is 0, an input 0 is selected as a Q value. If the value of the phase counter is 4859 and the value of the frame counter is not 0, an input 1 is selected as the Q value. The input 0 is an output Q from a selection circuit 1803, and a current value is maintained. A comparison circuit 1801 detects whether or not the value of the phase counter is 4859 and the value of the frame counter is 0.

An output of a subtraction circuit 1805 is input to the input 1 of the selection circuit 1802. The subtraction circuit 1805 outputs a value obtained by subtracting a value of the phase counter from the current output Q from the selection circuit 1803. Therefore, the processing in Operation S1604 is realized.

A selection circuit 1810 realizes the processing in Operation S1605. If the value of the frame counter is equal to or greater than 2, the input 0 is output as the output Q. If the value of the frame counter is less than 2, the input 1 is output as the output Q. Since the input 0 from the selection circuit 1810 is connected to the subtraction circuit 1805, the processing in Operation S1606 is realized. A comparison circuit 1809 detects whether or not the value of the frame counter is equal to or greater than 2.

A selection circuit 1808 realizes the processing in Operation S1607. If the value of the frame counter is 0, the input 0 is output as the output Q. If the value of the frame counter is not 0, the input 1 is output as the output Q. An output from an addition circuit 1804 is input to the input 0 of the selection circuit 1808. The addition circuit 1804 adds a value of the phase counter to the current output Q from the selection circuit 1803. Therefore, the addition circuit 1804 realizes the processing in Operation S1608. The comparison circuit 1809 detects whether or not the value of the frame counter is 0.

A selection circuit 1806 realizes the processing in Operation S1609. If a previous value of the frame counter is equal to or greater than a current value of the frame counter, the input 0 is output as the output Q and is then input to the input 1 of the selection circuit 1808. A comparison circuit 1807 detects whether or not the previous value of the frame counter is equal to or greater than the current value of the frame counter. An output from the addition circuit 1804 is input to the input 0 of the selection circuit 1806, and the processing in Operation S1610 is realized. An output from the subtraction circuit 1805 is input to the input 1 of the selection circuit 1806, and the processing in Operation S1611 is realized.

Incidentally, a plurality of PIUs 202 can be connected to a single MCU 201.

FIG. 19 is an explanatory diagram of a case in which a plurality of PIUs 202 are connected to a single MCU 201. In such a case, N frequency difference detection circuits 1902-1, 1902-2, . . . , 1902-N corresponding to N PIUs 202. The respective outputs from the N frequency difference detection circuits 1902-1, 1902-2, . . . , 1902-N are multiplexed by a code value MUX circuit 1901 and are output to a register block configured of the control register 219 illustrated in FIG. 2. A reference frame pulse signal is input to each of the N frequency difference detection circuits 1902-1, 1902-2, . . . , 1902-N, and each of the N PIUs 202 inputs a comparative frame pulse signal. In doing so, it is possible to cause each of the N frequency difference detection circuits 1902-1, 1902-2, . . . , 1902-N to operate in parallel and to connect the plurality of PIUs 202 to a single MCU 201.

COMPARATIVE EXAMPLE

FIG. 20 is a functional block diagram of a transmission apparatus 2000 according to a comparative example. The transmission apparatus 2000 includes an MCU 2001, a PIU 2002, and a BWB 2003 corresponding to the MCU 201, a PIU 202, and a BWB 203, respectively.

The MCU 2001 includes an intra-apparatus reference clock generation circuit 2006 corresponding to the intra-apparatus reference clock generation circuit 206. The MCU 2001 includes an intra-apparatus frame pulse generation circuit 2007 corresponding to the intra-apparatus frame pulse generation circuit 207.

However, the MCU 2001 includes an intra-apparatus frame pulse distribution circuit 2008 instead of the frequency difference detection circuit 208 while the MCU 201 includes the frequency difference detection circuit 208. The intra-apparatus frame pulse distribution circuit 2008 sends a reference frame pulse signal to the PIU 2002. Therefore, the control signal generation circuit 2009 does not accept a signal input from a circuit corresponding to the frequency difference detection circuit 208.

The MCU 2001 includes an intra-apparatus reference clock distribution circuit 2030-1 and sends a reference clock signal generated by the intra-apparatus reference clock generation circuit 2006 to the PIU 2002.

Similarly, the PIU 2002 includes a control signal receiving circuit 2029 and an oscillator 2032 corresponding to the control signal receiving circuit 223 and the oscillator 229, respectively. However, a control signal 2004 received by the control signal receiving circuit 2029 does not include information related to a frame pulse.

Therefore, the PIU 2002 receives a reference clock signal sent from the intra-apparatus reference clock distribution circuit 2030-1 by a synchronization clock receiving circuit 2030-2. The received reference clock signal is input to a PLL circuit formed of a phase comparator 2023, a lag lead filter 2024, a VCXO 2025, a frequency dividing circuit 2026, and a phase comparison frequency generator 2027. In doing so, a clock signal synchronized with the reference clock signal is generated.

The PIU 2002 includes a synchronization frame pulse receiving circuit 2028 instead of the intra-PIU frame pulse generation circuit 226. The synchronization frame pulse receiving circuit 2028 generates a frame pulse signal synchronized with the reference frame pulse signal at timing of the clock signal synchronized with the reference clock signal.

In the comparative example, the MCU 2001 additionally sends the reference clock signal to the PIU 2002 as compared with the embodiment, and the number of signal lines increases as compared with that in the embodiment as described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmission apparatus including a plurality of plug-in units each executing a part of functions of the transmission apparatus, the transmission apparatus comprising:
a first plug-in unit of the plurality of plug-in units configured to include:
a clock generator configured to generate a first clock signal,
a first frame pulse generator configured to generate a first frame pulse signal based on the first clock signal;
a detector configured to compare a first phase of the first frame pulse signal with a second phase of a second frame pulse signal transmitted from other plug-in unit of the plurality of plug-in units, detect a phase difference between the first phase and the second phase, and generate phase difference information based on the phase difference detected, and
a first transmitter configured to transmit a control signal including the phase difference information to the other plug-in unit; and
a second plug-in unit of the plurality of plug-in units, being the other plug-in unit, configured to include:
a receiver configured to receive the control signal transmitted from the first plug-in unit,
a controller configured to control a phase of a second clock signal generated by the second plug-in unit, based on the phase difference information included in the control signal,
a second frame pulse generator configured to generate the second frame pulse signal having the second phase based on the second clock signal, and
a second transmitter configured to transmit the second frame pulse signal to the first plug-in unit.

2. The transmission apparatus according to claim 1, wherein the first transmitter transmits the control signal including encoded phase difference information.

3. The transmission apparatus according to claim 1, wherein the detector includes
a first counter configured to measure a time length from generation of a pulse of the first frame pulse signal to generation of a pulse of the second frame pulse signal, and
a second counter configured to measure a number of pulses of the second frame pulse signal generated between two continuously generated pulses of the first frame pulse signal, and
wherein the phase difference information is generated, based on the time length measured by the first counter and the number of pulses measured by the second counter.

4. The transmission apparatus according to claim 3, wherein the controller reduces a frequency of the second clock signal so as to control the phase of the second clock signal in a case where the number of pulses of the phase difference information included in the control signal received by the receiver, which is measured by the second counter, is two or more.

5. The transmission apparatus according to claim 3, wherein the controller increases the frequency of the second clock signal so as to control the phase of the second clock signal, when time lengths measured by the first counter of the phase difference information included in two continuously received control signals increase, in a case where the number of pulses of the phase difference information included in the control signal received by the receiver, which is measured by the second counter, is zero or one.

6. The transmission apparatus according to claim 3, wherein the controller reduces the frequency of the second clock signal so as to control the phase of the second clock signal, when time lengths measured by the first counter of the phase difference information included in two continuously received control signals decrease, in a case where the number of pulses of the phase difference information included in the control signal received by the receiver, which is measured by the second counter, is zero or one.

7. The transmission apparatus according to claim 3, wherein the controller sets a numerical value calculated by using the number of pulses measured by the second counter and the time length measured by the first counter in the phase difference information included in the control signal received by the receiver, and
wherein the second frame pulse generator generates the second frame pulse signal at a frequency in accordance with the numerical value set by the controller.

8. The transmission apparatus according to claim 1, wherein when the detector detects that the first phase matches the second phase,
the first frame pulse generator reduces a frequency of the first frame pulse signal to be lower than a frequency before a detection of matching the first phase and the second phase, and
the second frame pulse generator reduces a frequency of the second frame pulse signal to be lower than that before the detection at same ratio as the reduction of the frequency of the first frame pulse signal.

9. A plug-in unit of a plurality of plug-in units each executing a part of functions of a transmission apparatus, the plug-in unit comprising:
a clock generator configured to generate a clock signal;
a frame pulse generator configured to generate a first frame pulse signal based on the clock signal;
a detector configured to compare a first phase of the first frame pulse signal with a second phase of a second frame pulse signal transmitted from other plug-in unit of the plurality of plug-in units, detect a phase difference between the first phase and the second phase, and generate phase difference information based on the phase difference detected; and
a transmitter configured to transmit a control signal including the phase difference information to the other plug-in unit.

10. The plug-in unit according to claim 9, wherein the transmitter transmits the control signal including encoded phase difference information.

11. The plug-in unit according to claim 9, wherein the detector includes
a first counter configured to measure a time length from generation of a pulse of the first frame pulse signal to generation of a pulse of the second frame pulse signal, and
a second counter configured to measure a number of pulses of the second frame pulse signal generated between two continuously generated pulses of the first frame pulse signal, and
wherein the phase difference information is generated, based on the time length measured by the first counter and the number of pulses measured by the second counter.

12. The plug-in unit according to claim 9, wherein when the detector detects that the first phase matches the second phase, the frame pulse generator reduces a frequency of the first frame pulse signal to be lower than a frequency before the detection.

13. A plug-in unit of a plurality of plug-in units each executing a part of functions of a transmission apparatus, the plug-in unit comprising:
a clock generator configured to generate a clock signal;
a receiver configured to receive a control signal including a phase difference information based on a phase difference between a first phase of a first frame pulse signal generated by another plug-in unit of the plurality of plug-in units and a second phase of a second frame pulse signal to be transmitted to the another plug-in unit, the control signal being transmitted from the another plug-in unit;
a controller configured to control a phase of the clock signal generated by the clock generator, based on the phase difference information included in the control signal; and
a frame pulse generator configured to generate the second frame pulse signal having the second phase based on the clock signal generated by the clock generator.

14. The plug-in unit according to claim 13, wherein the phase difference information is encoded.

15. The plug-in unit according to claim 13, wherein the another plug-in unit includes
a first counter configured to measure a time length from generation of a pulse of the first frame pulse signal to generation of a pulse of the second frame pulse signal, and
a second counter configured to measure a number of pulses of the second frame pulse signal generated by the frame pulse generator between two continuously generated pulses of the first frame pulse signal,
wherein the phase difference information included in the control signal is generated, based on the time length measured by the first counter and the number of pulses measured by the second counter, and
wherein the controller reduces a frequency of the clock signal so as to control the phase of the clock signal when the number of pulses of the phase difference information included in the control signal received by the receiver, which is measured by the second counter, is two or more.

16. The plug-in unit according to claim 15, wherein the controller increases the frequency of the clock signal so as to control the phase of the clock signal, when time lengths measured by the first counter of the phase difference information included in two continuously received control signals increase, in a case where the number of pulses of the phase difference information included in the control signal received by the receiver, which is measured by the second counter, is zero or one.

17. The plug-in unit according to claim 15, wherein the controller reduces the frequency of the clock signal so as to control the phase of the clock signal, when time lengths measured by the first counter of the phase difference information included in two continuously received control signals decrease, in a case where the number of pulses of the phase difference information included in the control signal received by the receiver, which is measured by the second counter, is zero or one.

18. The plug-in unit according to claim 15,
wherein the controller sets a numerical value calculated by using the number of pulses measured by the second counter and the time length measured by the first counter of the phase difference information included in the control signal received by the receiver, and
wherein the frame pulse generator generates the second frame pulse signal at a frequency in accordance with the numerical value set by the controller.

19. The plug-in unit according to claim 13,
wherein, when synchronization of the first frame pulse signal and the second frame pulse signal is detected, the frame pulse generator reduces a frequency of the second frame pulse signal to be lower than frequency before the detection of the synchronization.

* * * * *